US010863136B2

(12) United States Patent
Astavans et al.

(10) Patent No.: US 10,863,136 B2
(45) Date of Patent: *Dec. 8, 2020

(54) SWITCH VIEW FUNCTIONS FOR TELECONFERENCE SESSIONS

(71) Applicant: Microsoft Technology Licensing, LLC, Redmond, WA (US)

(72) Inventors: Ruchir Astavans, Redmond, WA (US); Kevin D. Morrison, Arlington, MA (US); Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,173

(22) Filed: Aug. 15, 2019

(65) Prior Publication Data

US 2020/0036941 A1   Jan. 30, 2020

Related U.S. Application Data

(63) Continuation of application No. 15/407,220, filed on Jan. 16, 2017, now Pat. No. 10,389,974.

(51) Int. Cl.
*H04N 7/14*     (2006.01)
*H04N 7/15*     (2006.01)
(Continued)

(52) U.S. Cl.
CPC ............ *H04N 7/147* (2013.01); *H04N 7/152* (2013.01); *G06F 3/0488* (2013.01); *G06F 3/04817* (2013.01); *G06F 2203/04803* (2013.01)

(58) Field of Classification Search
CPC ......... G06F 2203/04803; G06F 3/0488; G06F 3/0481; G06F 3/04817; G06F 3/0484; H04N 7/147; H04N 7/15; H04N 7/152
See application file for complete search history.

(56) References Cited

U.S. PATENT DOCUMENTS 9,197,853 B2 * 11/2015 Shi ........................... H04N 7/15
9,204,099 B2 * 12/2015 Brown .................. H04N 7/152
(Continued)

OTHER PUBLICATIONS

Cisco WebEx Training Center User Guide Oct. 23, 2013 599 pages (Year: 2013).*

*Primary Examiner* — Andrea N Long
(74) *Attorney, Agent, or Firm* — Newport IP, LLC; Scott Y. Shigeta

(57) ABSTRACT

Systems and methods for hosting a teleconference session are presented. One or more streams are received from a plurality of client computing devices at a server. The streams are combined to generate teleconference data. The teleconference data may be configured to display a first user interface arrangement in which a primary stream display area dominates a display with a secondary stream display area overlaid on the primary stream display area. The secondary stream display area may disappear after a period of time. The teleconference data may also be configured to display a second user interface arrangement in which the primary stream display area and secondary stream display area are displayed concurrently. A view control switch may be triggered to switch between the first and second user interface arrangement views.

20 Claims, 11 Drawing Sheets

Overlay-Immersive, User On

(51) Int. Cl.
*G06F 3/0488* (2013.01)
*G06F 3/0481* (2013.01)

(56) References Cited

U.S. PATENT DOCUMENTS

| | | | |
|---|---|---|---|
| 9,325,938 B2* | 4/2016 | Paragano | H04N 7/141 |
| 9,952,751 B2* | 4/2018 | Gottlieb | H04L 65/4038 |
| 2004/0230651 A1* | 11/2004 | Ivashin | H04L 29/06027 |
| | | | 709/204 |
| 2005/0099492 A1* | 5/2005 | Orr | H04L 12/1827 |
| | | | 348/14.08 |
| 2011/0271211 A1* | 11/2011 | Jones | H04M 3/567 |
| | | | 715/753 |
| 2014/0101572 A1* | 4/2014 | Gunderson | G06F 3/0481 |
| | | | 715/758 |
| 2014/0184723 A1* | 7/2014 | Morrison | H04N 7/147 |
| | | | 348/14.07 |
| 2016/0073055 A1* | 3/2016 | Marsh | H04N 7/152 |
| | | | 348/14.08 |

* cited by examiner

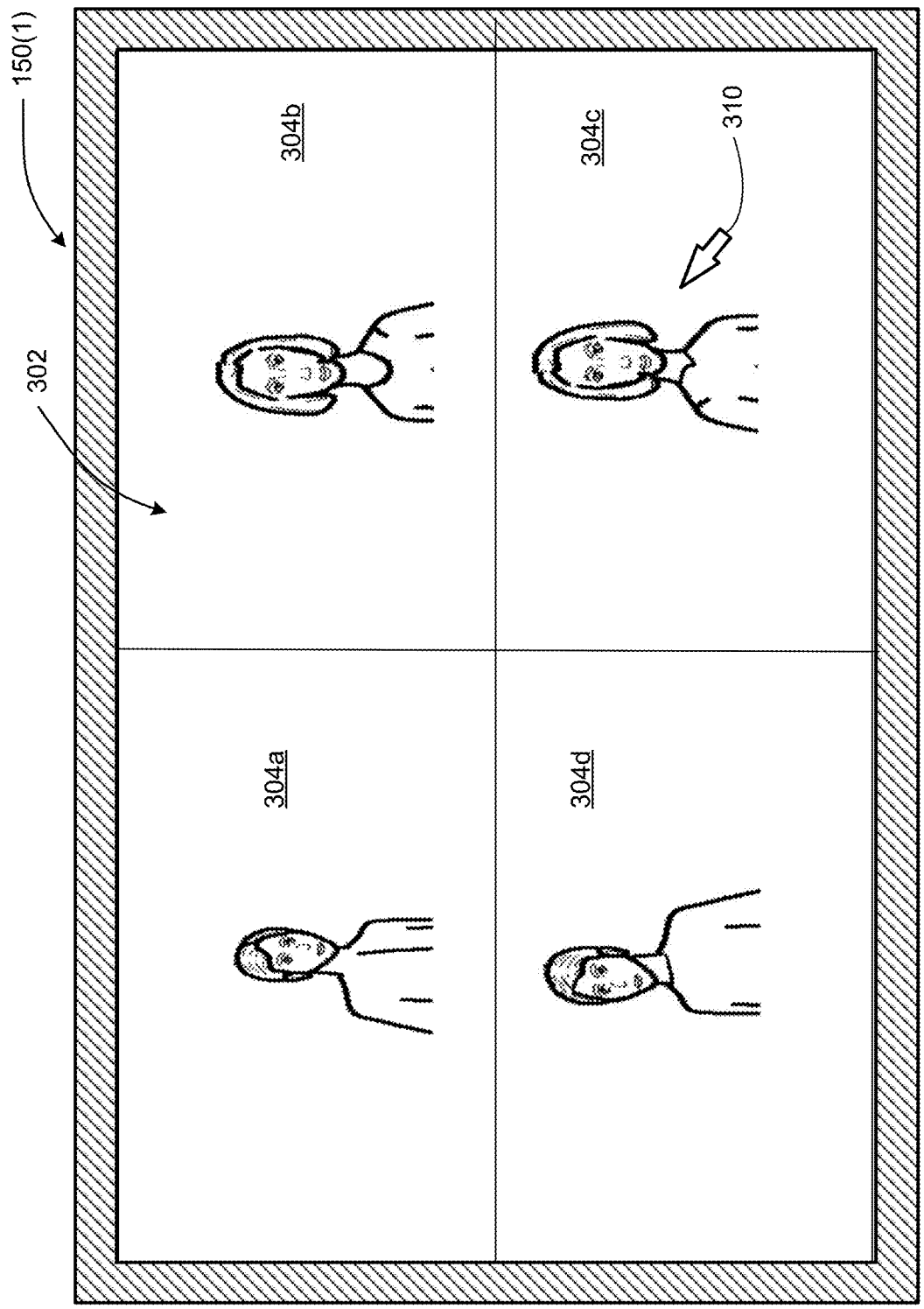
FIG. 3A-Overlay – Immersive, User Off

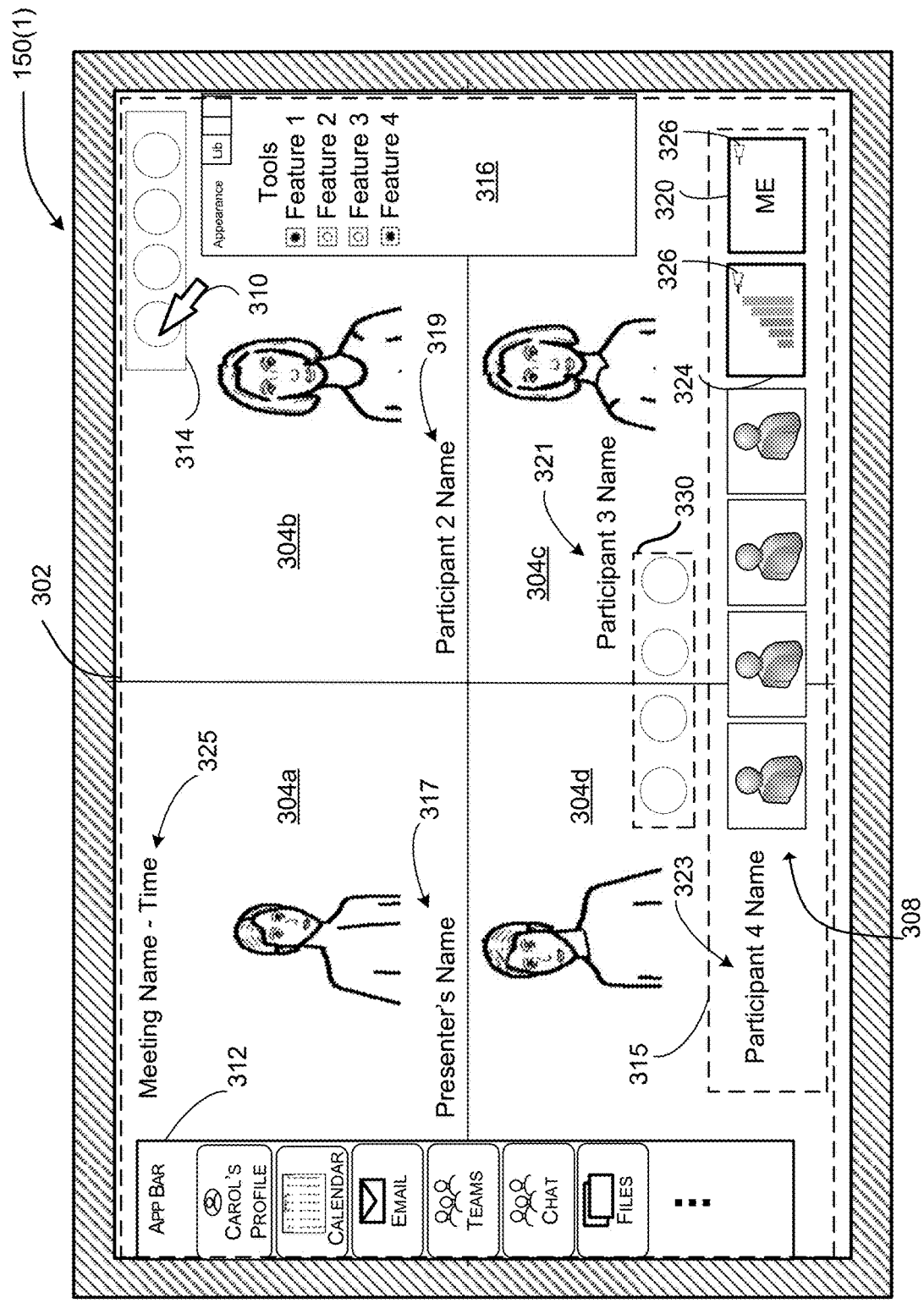
FIG. 3B-Overlay-Immersive, User On

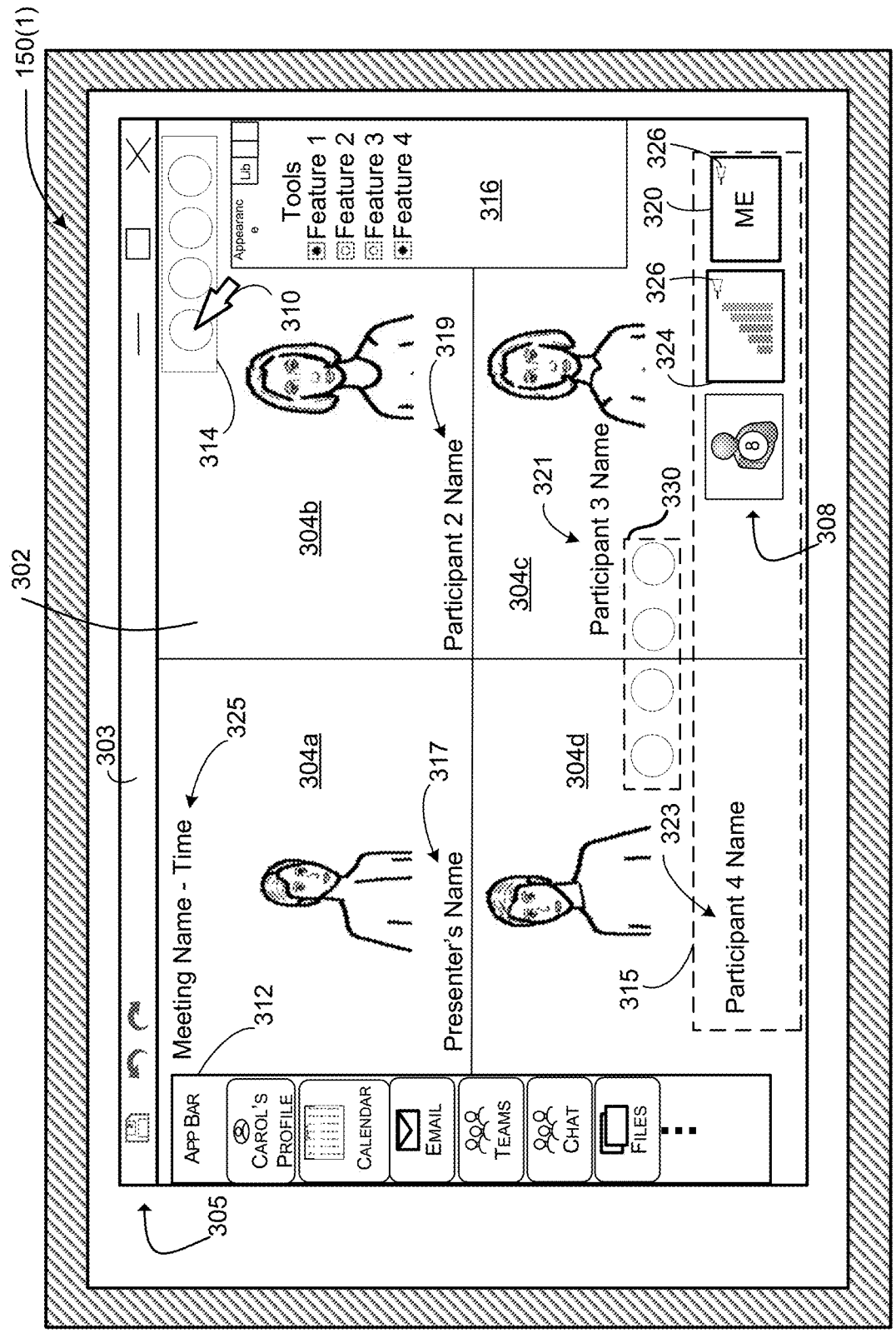
FIG. 3C-Overlay-Windowed, User On

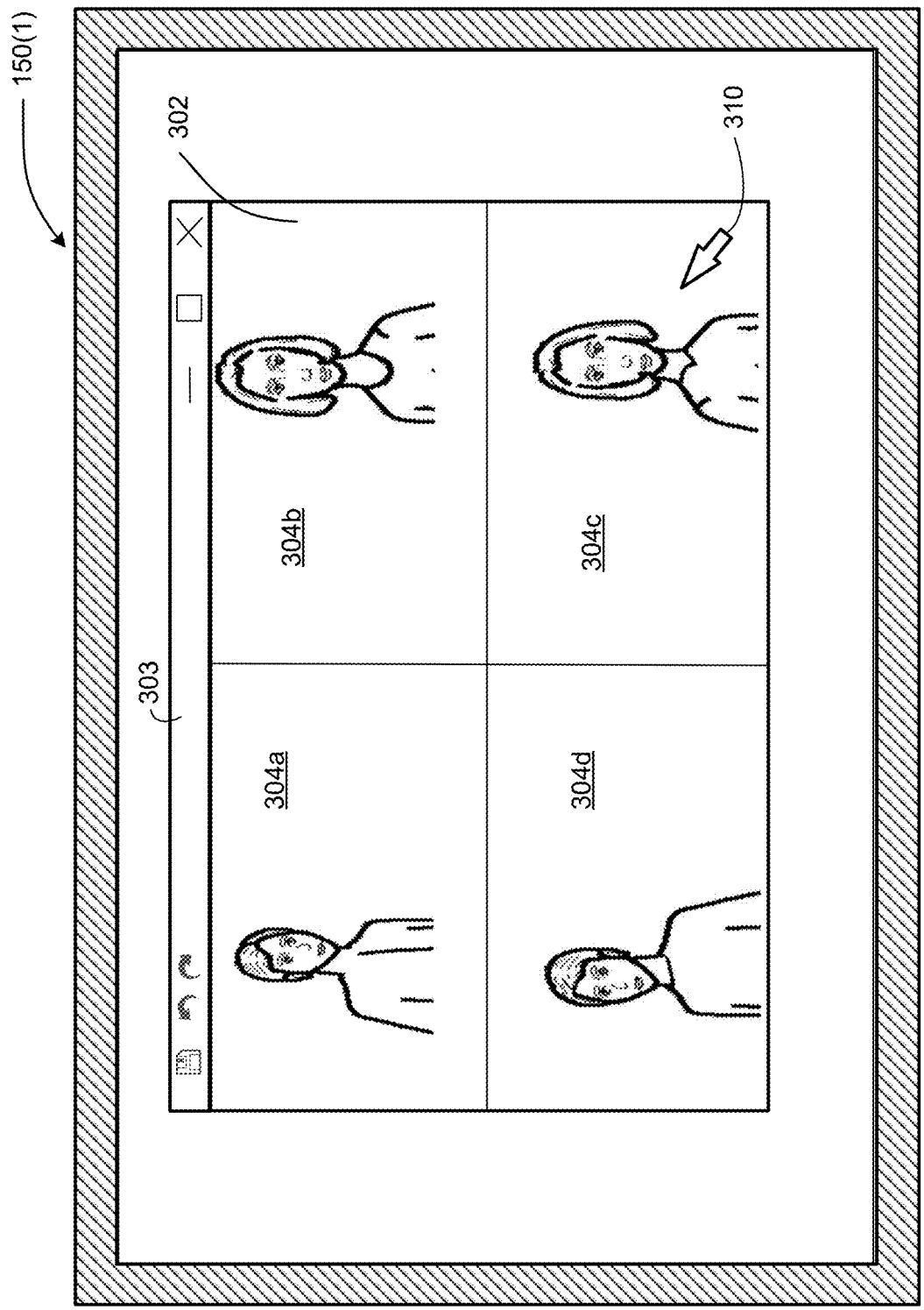
FIG. 3D-Overlay – Windowed, User Off

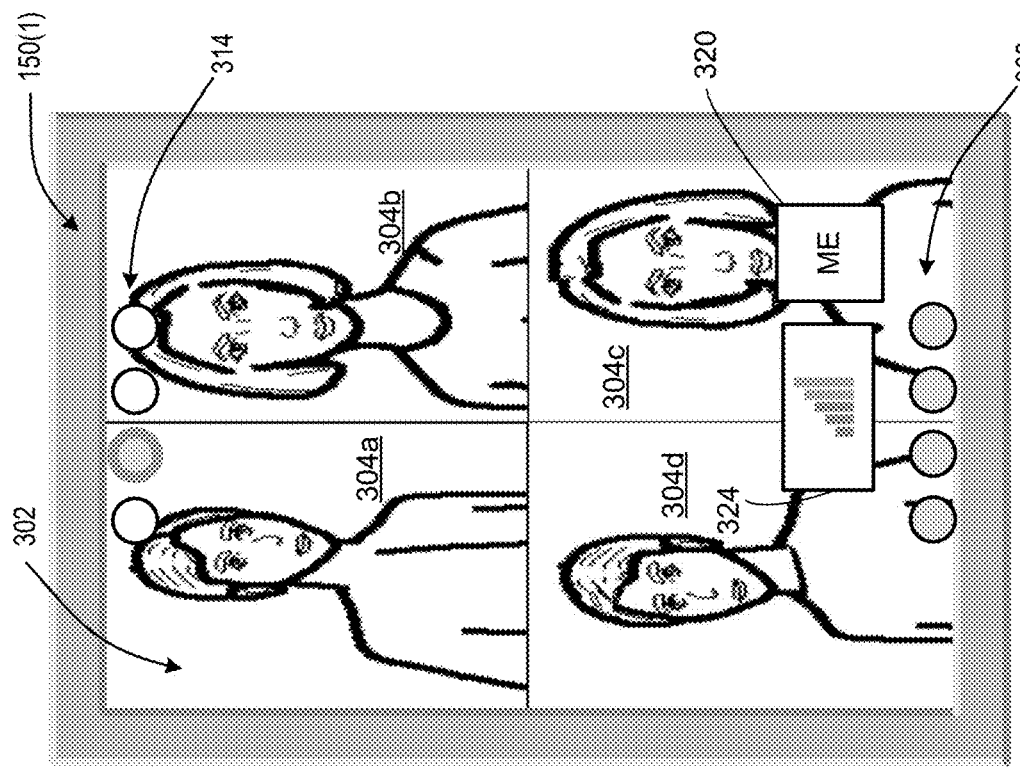
FIG. 3F-Overlay
Immersive User-On
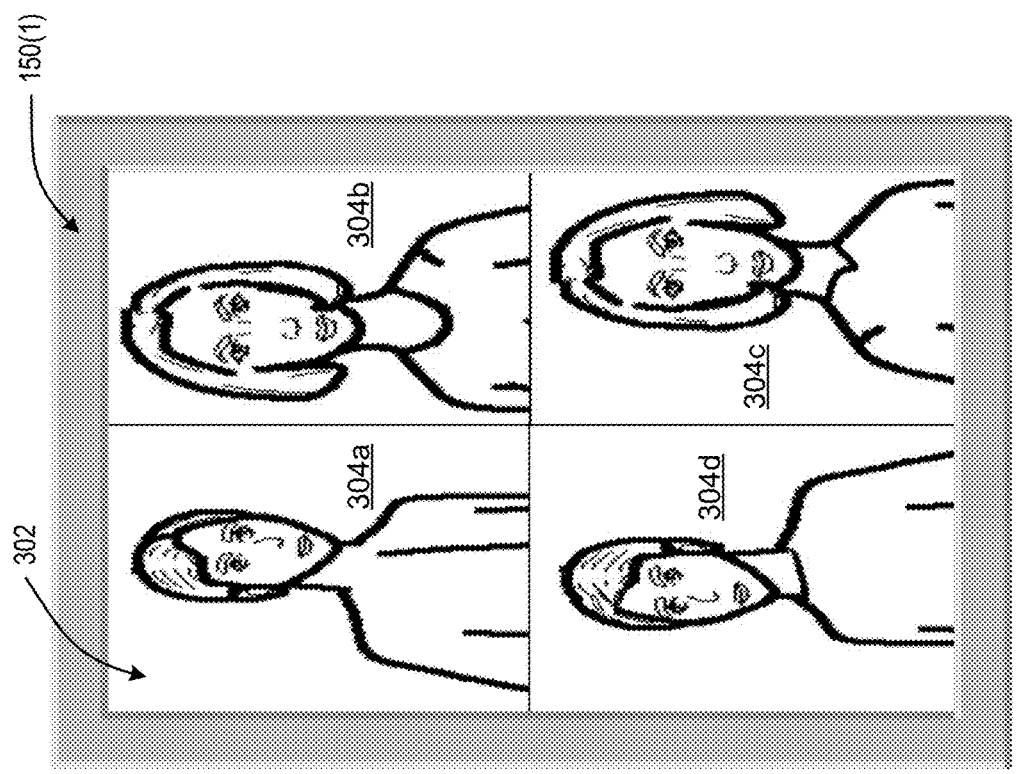
FIG. 3E-Overlay
Immersive User-Off

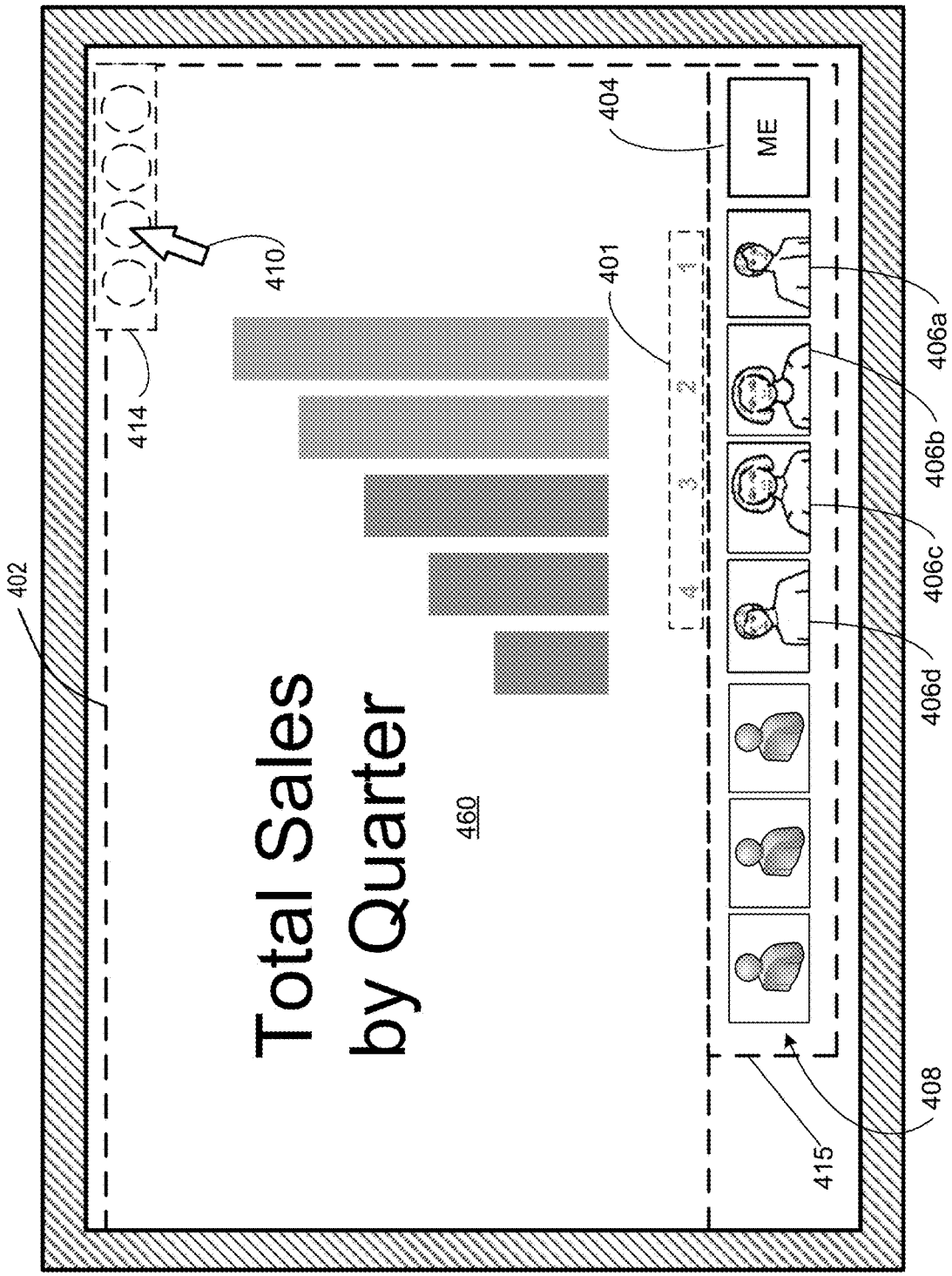
FIG. 4A-Persistent – Immersive

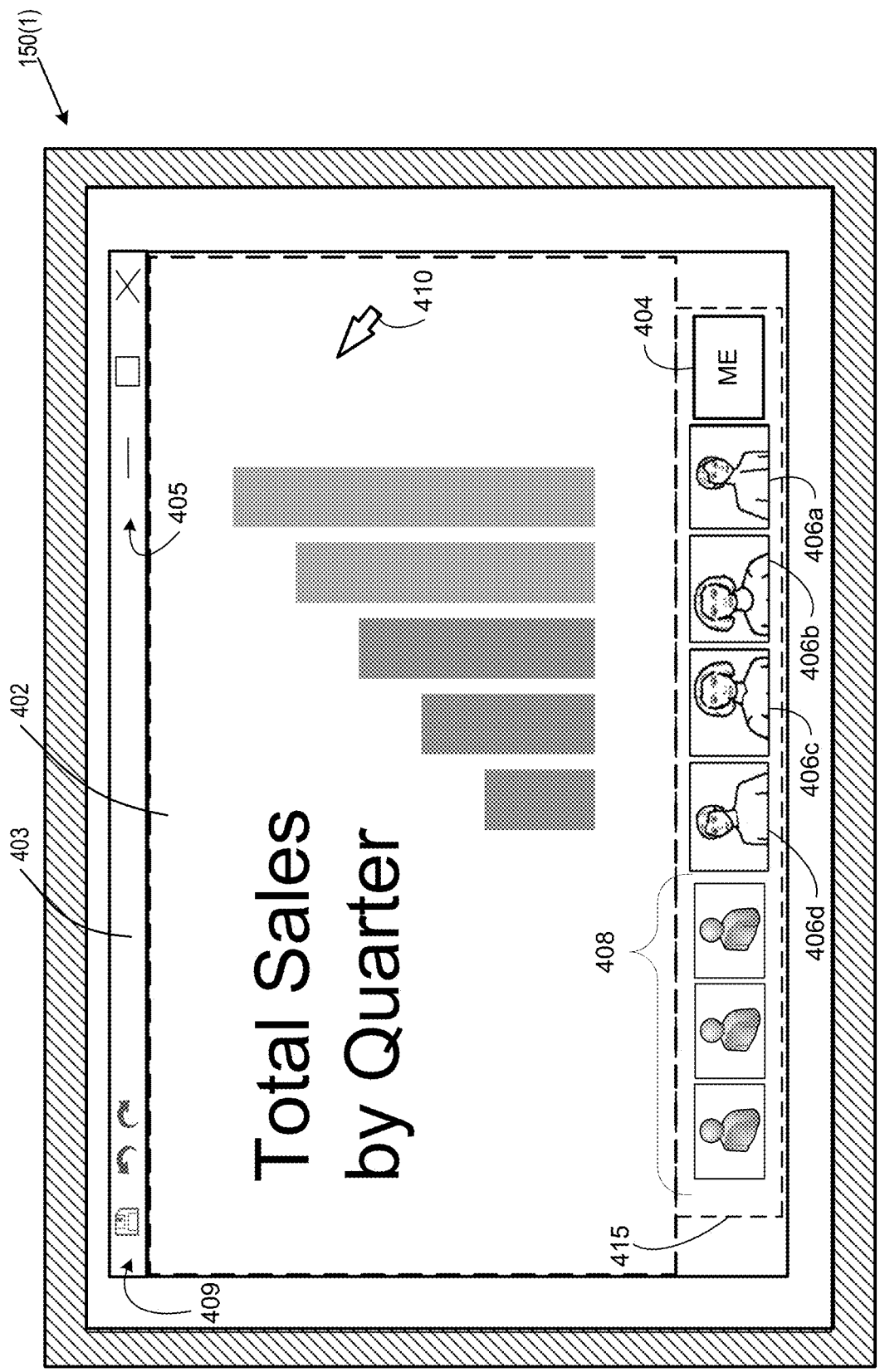
FIG. 4B – Persistent - Windowed

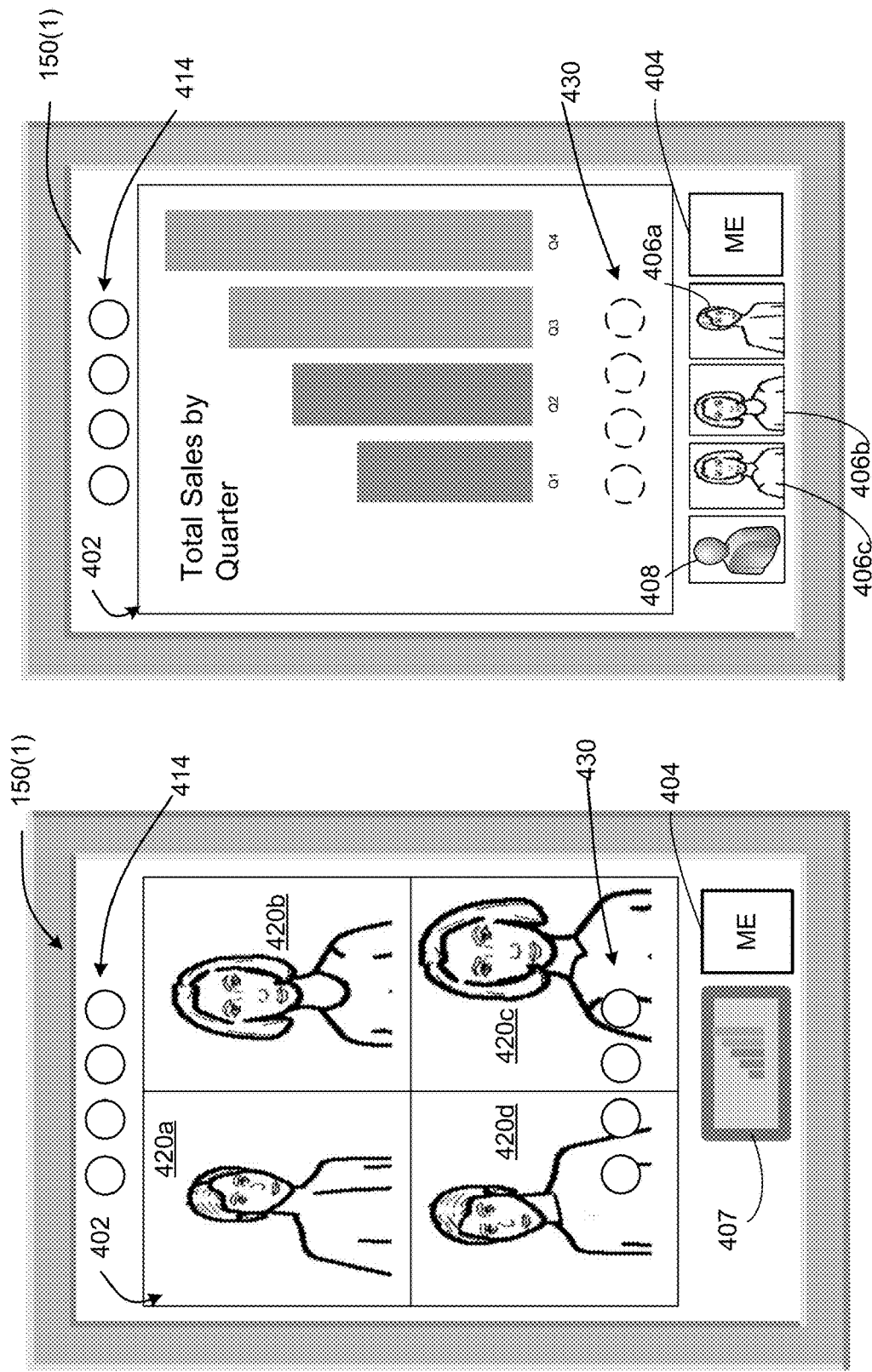
FIG. 4C -Persistent: People Dominant    FIG. 4D -Persistent: Content Dominant

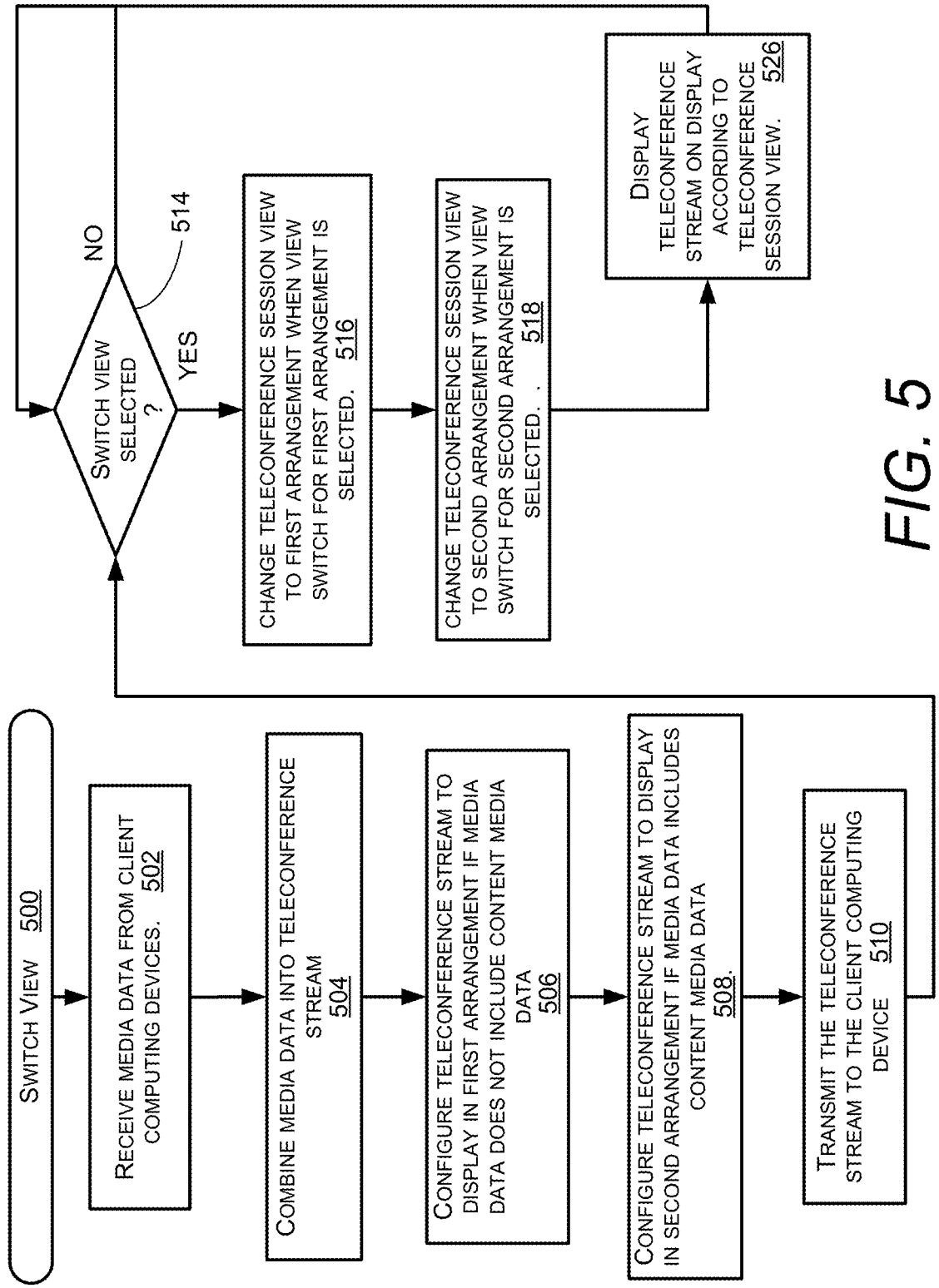

SWITCH VIEW FUNCTIONS FOR TELECONFERENCE SESSIONS

CROSS REFERENCE TO RELATED APPLICATION

This patent application is a continuation of U.S. patent application Ser. No. 15/407,220, filed Jan. 16, 2017, entitled "SWITCH VIEW FUNCTIONS FOR TELECONFERENCE SESSIONS," which is hereby incorporated in its entirety by reference.

BACKGROUND

At present, the use of teleconference systems in commercial and corporate settings has increased dramatically in facilitating meetings and conferences between people in remote locations, reducing the need for travel so as to bring these people physically together in order to conduct the meetings or conferences. In general, teleconference systems allow users (i.e., people) of a teleconference system, in two or more remote locations, to communicate interactively with each other via live, simultaneous two-way video streams, audio streams, or both. Some teleconference systems (such as, for example, Cisco WebEx provided by Cisco Systems, Inc. of San Jose, Calif., GoToMeeting provided by Citrix Systems, Inc. of Santa Clara, Calif., Zoom provided by Zoom Video Communications of San Jose, Calif., Google Hangouts by Alphabet Inc. of Mountain View, Calif., and Skype® provided by Microsoft Corporation, of Redmond, Wash.) also allow users to exchange digital documents such as, for example, images, text, video and any others.

A limitation to teleconference systems is that they do not allow remote users to experience the typical interactions that occur at live meetings when all the users are physically present at the same location. Most teleconference systems utilize remote communication devices (such as, for example, video terminals, personal computers (both desktop and portable) and mobile devices such as, for example, tablets, smartphones, etc.) that display video and play audio from the meeting, or conference, on a video display that may vary in size from approximately 3 inches to approximately 65 inches based on the type of communication device or video display. As a result, the remote users of the teleconference system are typically limited to viewing the interactions of the meeting, or conference, through a "window" of the meeting, or conference, produced by the video display, which may be the screen of a mobile device, computer monitor, or large video display.

This results in a user interface that produces a flat "thumbnail" style people and content experience for the remote users of the teleconference system attending the meeting or conference. Generally, this user interface only allows users to see framed individuals (i.e., other people attending the meeting or conference) in a gallery experience with a lot of negative space in the user interface that is not engaging for the remote users.

Additionally, the remote users are simply monitoring cameras from fixed positions which may be located either at the location of the physical meeting, or conference, or at the location of other remote users attending the meeting, or conference. Moreover, in some teleconference systems, some remote users may see multiple displays of fixed streams of video data on their video displays with very few options for allowing each participant to change their views to see important or salient portions of the shared media. Therefore, the resulting user interface of these types of teleconference systems typically leaves the remote users bored and unengaged.

As such, there is a need for an improved teleconference system that addresses these issues. It is with respect to these and other considerations that the disclosure made herein is presented.

SUMMARY

The techniques disclosed herein provide view switching functions for teleconference sessions. The features disclosed herein enable users to harness the power of video, content and storytelling to transform the meeting experience through more life-like group engagement by utilizing unique persistent and immersive overlay views as a default or user controlled switching view model. The solution reaches across synchronous and asynchronous experiences during communication events on the audio/video/content stage allowing the participant, e.g., a user interacting with a teleconference session, to engage with what's important to them.

In some embodiments, media data or streams are received from a plurality of client computing devices at a server. The media data are combined by the server to generate teleconference data defining aspects of a teleconference session. The teleconference data can comprise individual data streams, also referred to herein as "streams," which can comprise content streams or participant streams. The participant streams include video of one or more participants. The content streams may include video or images of files, data structures, word processing documents, formatted documents (e.g. PDF documents), spreadsheets, or presentations. The content streams include all streams that are not participant streams. In some configurations, the participant streams can include video data, and in some configurations audio data, streaming live from a video camera connected to the participant's client computing device. In some instances, a participant may not have access to a video camera and may communicate a participant stream comprising an image of the participant, or an image representative of the participant, such as, for example, an avatar.

The teleconference data and/or the streams of the teleconference data can be configured to cause a computing device to generate a user interface comprising a primary stream display area for rendering a first stream of the teleconference data and a secondary stream display area for rendering a second stream of the teleconference data. The teleconference data is configured to cause at least one client computing device of the plurality of client computing devices to display a first user interface arrangement that displays the secondary stream display area overlaid on the primary stream display area as a default when no content is part of the teleconference data, or in a second user interface arrangement that displays the primary stream display area and secondary stream display area in a nonoverlapping format as a default when content is part of the teleconference data. In some configurations, the primary stream display area and the secondary stream display area are in a side-by-side format as a default when content is part of the teleconference data. The teleconference data is transmitted to at least one client computing device for display of the first user interface arrangement or the second user interface arrangement. A view switch control signal is received from the selected client computing device. The teleconference data is switched to the second user interface arrangement when the view switch control signal indicates a request to view the teleconference session in the second user interface arrangement. The teleconference data is switched to the first user interface arrangement view when the view switch control signal indicates a request to view the teleconference session in the first user interface arrangement.

The teleconference data may switch between the first user interface arrangement and the second user interface arrangement based on whether content is added or removed during the teleconference session. The teleconference data may be configured to provide a windowed display in which the teleconference session is displayed over a window display area within a screen area of the display device. The teleconference data may also be configured to provide an immersive display in which the teleconference session is displayed over the screen area of the display device thereby providing a more connected experience to the participants.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

FIGS. 3A and 3B are screenshot views of a display corresponding to one of the client computing devices in the teleconference session illustrating a first user interface arrangement to which the display may be switched in an immersive display mode.

FIGS. 3C and 3D are screenshot views of a display corresponding to one of the client computing devices in the teleconference session illustrating a first user interface arrangement to which the display may be switched in a windowed display mode.

FIGS. 3E and 3F are screenshot views of a display corresponding to one of the mobile client computing devices in the teleconference session illustrating a first user interface arrangement to which the display may be switched.

FIGS. 4A and 4B are screenshot views of a display corresponding to one of the client computing devices in the teleconference session illustrating a second user interface arrangement to which the display may be switched.

FIGS. 4C and 4D are screenshot views of a display corresponding to one of the mobile client computing devices in the teleconference session illustrating a second user interface arrangement to which the display may be switched.

FIG. 5 is a flowchart illustrating operation of a switch view function in the example teleconference system of FIG. 1.

DETAILED DESCRIPTION

Figure 1:
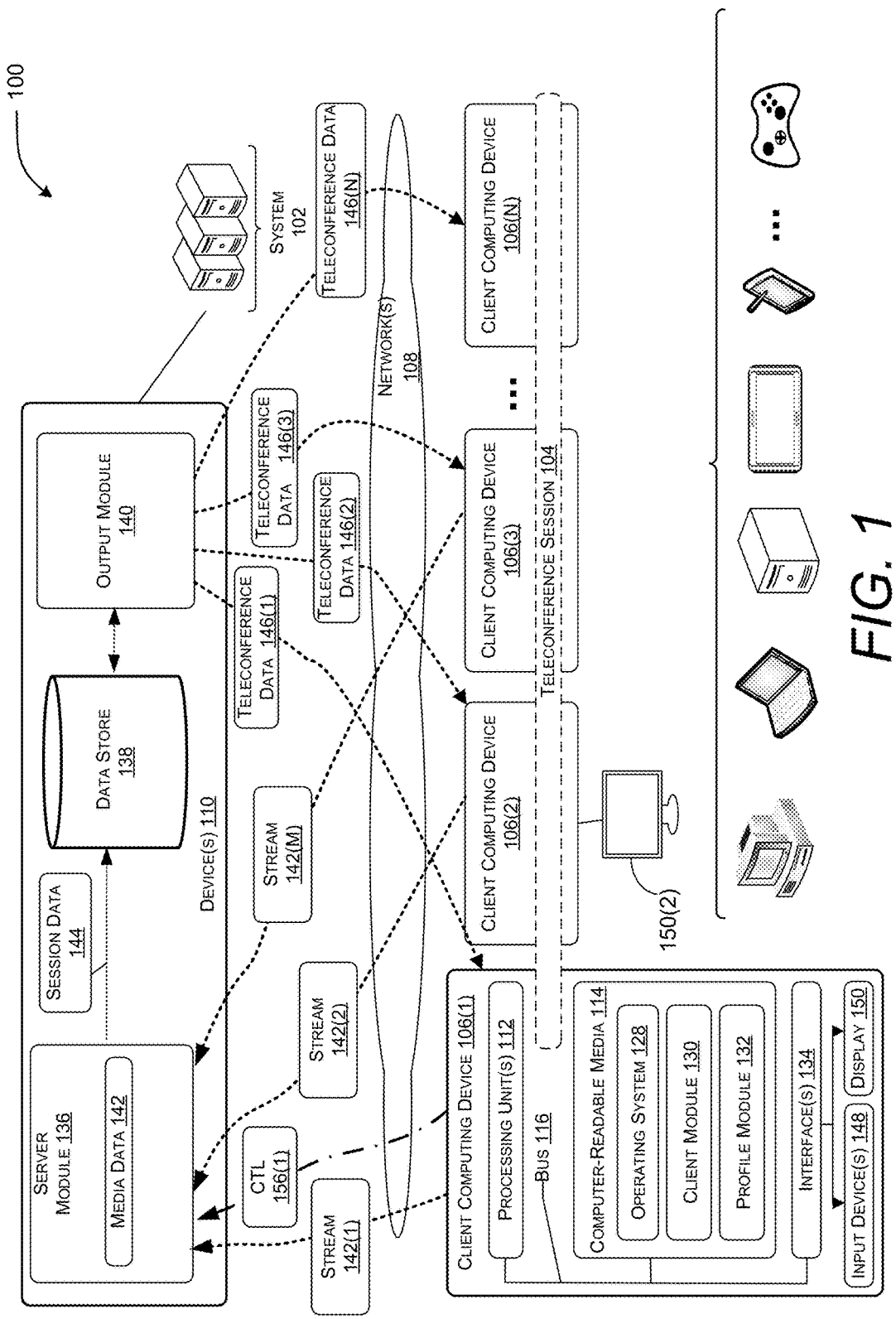
FIG. 1 is a block diagram of an example of a teleconference system.

Examples described below enable a system to provide a teleconference session at a client computing device with the capability of controlling the display of the session on the client computing device. The teleconference session may be controlled at a teleconference server connected to a plurality of client computing devices participating in the teleconference session. The client computing devices may be configured to allow a user to control his or her viewing experience of the teleconference session using graphical user interface controls available during the session. In an example implementation, the teleconference session receives participant streams from client computing devices used by the participants. The participant streams include video, audio, or image data of the participants to identify or represent the participants in the display of the teleconference session at the client computing devices. The teleconference session may also receive content streams from one or more client computing devices, or from another source. The content streams include all streams that are not participant streams. In some configurations, the content streams include video or image data of files, data structures, word processing documents, formatted documents (e.g. PDF documents), spreadsheets, or presentations to be presented to, and thereby shared with, the participants in the display of the teleconference session. The teleconference session at the server combines the streams to generate teleconference data and transmits the teleconference data to each client computing device according to a teleconference session view configured for each client computing device.

In the description below, streams may be referred to as "media data." Content streams may be referred to as "content media data," and participant streams may be referred to as "user media data." As noted above, the user media data, like participant streams, may audio and/or video or image data depicting or representing the participant in the teleconference session. The content media data, like the content streams, may be an image or video representing a document, video, audio or other media content that may be shared with the users of the client computing devices for discussion among the participants of the teleconference session.

The teleconference session view may be tailored for each client computing device using one of several user interface arrangements. For a given client computing device, the teleconference session view may be in a first user interface arrangement referred to herein as an overlay view, a second user interface arrangement referred to herein as a persistent view, or in other desired views. An overlay view provides a total display experience in which either people or content is viewed "on stage," which is a primary stream display area of an interface. In some configurations, the primary stream display area of an interface can be displayed in a manner that dominates the display on a user's client computing device. The overlay view allows a user to engage with the content being shared among the teleconference participants, or on the participants, at least the most active participants themselves. For illustrative purposes, an overlay view comprises at least one interface element that "overlaps" the primary stream display area. User interface elements can display streams of the media data that correspond to participants and the content that is not being displayed on stage. In a user-ON state, the user interface elements are presented to allow the user to display to the participant other participants and/or content that may be present during the teleconference. An overlay view also provides a secondary stream display area that includes user interface elements displaying participants or content that are not displayed in the primary stream display area. For instance, if content is displayed in the primary stream display area, a video stream of participants can be displayed in the secondary stream display area. As will be described in more detail below, the user interface elements in the secondary stream display area can be displayed for a predetermined period of time and then fade or disappear after the predetermined period of time has lapsed.

For illustrative purposes, when the user interface elements in the secondary stream display area are rendered, the user interface is described herein as being in the "user-ON" state. When the user interface elements in the secondary stream display area are not rendered, the user interface is described herein as being in the "user-OFF" state. The user-OFF state allows a display of on-stage media without the display of the overlaid user interface elements. In addition, in the overlay view, the secondary stream display area overlaps the primary stream display area. In some configurations, the primary stream display area is larger than then secondary stream display area. For illustrative purposes, such an arrangement is described herein as an overlapping configuration.

In some implementations, the overlay view may be displayed in one of two display modes. A first display mode is a "windowed mode," which includes a frame around the primary stream display area, wherein the frame comprises control user interface elements for controlling aspects of the windows, such as minimizing, maximizing, or closing the user interface. The overlay view may also be displayed in an "immersive mode," which does not include a frame. In the immersive mode, the primary stream display area can occupy the entire display area of a device.

In the persistent view, the content or participants are displayed in the primary stream display area, where the primary stream display area occupies a majority of the display leaving space for a secondary stream display area. In the persistent view, the secondary stream display area does not overlap the primary stream display area; such an arrangement is described herein as a side-by-side configuration. The secondary stream display area includes user interface elements that display participants or content that are not displayed in the primary stream display area. The secondary stream display area is visibly under-emphasized, at least in size, compared to the primary stream display area. The user interface elements in the secondary stream display area remain displayed without a timeout feature.

The persistent view may also be displayed in the two display modes described above for the overlay view. The persistent view may be displayed in a "windowed mode," which includes a frame around the primary stream display area, wherein the frame comprises control user interface elements for controlling aspects of the windows, such as minimizing, maximizing, or closing the user interface. The persistent view may also be displayed in an "immersive mode," which does not include a frame. In the immersive mode, the primary stream display area and the secondary stream display area, arranged in the side-by-side configuration, can occupy the entire display area of a device.

The display mode may be changed by the user as a function of configuring the display, or as a control provided by the teleconference session application on the client computing device. In the windowed mode, the teleconference session may be viewed on the display in an application window on the display screen with other windows that may be operating on other applications. The overlay and persistent views would then display as either an overlay-windowed or persistent-windowed view. In the immersive mode, the teleconference session application displays on the entire display screen. The overlay and persistent views would then display in either an overlay-immersive view or persistent-immersive view.

User interface elements are provided to allow the user to switch between different arrangements as described in more detail below. In example implementations as described below, the user interface elements allow the user to switch between the overlay and persistent views. Other views in addition to the overlay and persistent views may be provided. The user may be provided with tools to switch between the views to alter the user's experience of the teleconference session.

In FIG. 1, a diagram illustrating an example of a teleconference system 100 is shown in which a system 102 can control the display of a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110, and the device(s) 110 and/or other components of the system 102 may include distributed computing resources that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phones, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses. The computer-readable media 114 may store executable instructions and data used by programmed functions during operation. Examples of functions implemented by executable instructions stored on the computer-readable media 114 may include, for example, an operating system 128, a client module 130, a profile module 132, and other modules, programs, or applications that are loadable and executable by processing units(s) 112.

Client computing device(s) 106(1) through 106(N) may also include one or more interface(s) 134 to enable communications with other input devices 148 such as network interfaces, cameras, keyboards, touch screens 106(3), and pointing devices (mouse). For example, the interface(s) 134 enable communications between client computing device(s) 106(1) through 106(N) and other networked devices, such as device(s) 110 and/or devices of the system 102, over network(s) 108. Such network interface(s) 134 may include one or more network interface controllers (NICs) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) over the network 108.

The client module 130 of each client computing device 106(1) through 106(N) may include logic that detects user input and communicates control signals to the server to request changes in the view of the teleconference session 104 on the display. For example, the client module 130 in the first client computing device 106(1) in FIG. 1 may detect a user input at an input device 148. The user input may be sensed, for example, as a finger press on a user interface element displayed on a touchscreen, or as a click of a mouse on a user interface element selected by a pointer on the display 150. The client module 130 translates the user input according to a function associated with the selected user interface element. The client module 130 may send a control signal 156(1) to a server (for example, a server operating on the device 110) to perform the desired function.

In one example function described in more detail below, the user of the client computing device 106(1) may wish to switch the view on the display 150 from a first user interface arrangement that provides a first look, feel and experience for the participant to a second user interface arrangement that provides a different look, feel and experience. The user may click on the desired user interface element, such as a button, for example, on the user's display 150. The client module 130 may identify the click of the button as a request to switch views and send a corresponding control signal 156(1) to a teleconference session host to perform the view switching function. The control signal 156(1) in this function is a view switch control signal.

The client computing device(s) 106(1) . . . 106(N) may use their respective profile modules 132 to generate participant profiles, and provide the participant profiles to other client computing devices and/or to the device(s) 110 of the system 102. A participant profile may include one or more of an identity of a participant (e.g., a name, a unique identifier ("ID"), etc.), participant data, such as personal data and location data may be stored. Participant profiles may be utilized to register participants for teleconference sessions.

As shown in FIG. 1, the device(s) 110 of the system 102 includes a server module 136, a data store 138, and an output module 140. The server module 136 is configured to receive, from individual client computing devices 106(1) through 106(N), stream 142(1) through 142(M) (where M is a positive integer number equal to 2 or greater). In some scenarios, not all the client computing devices utilized to participate in the teleconference session 104 provide an instance of streams 142, and thus, M (the number of instances submitted) may not be equal to N (the number of client computing devices). In some other scenarios, one or more of the client computing devices may be communicating an additional stream or transmission of media data that includes content, such as a document or other similar type of media intended to be shared during the teleconference session.

The server module 136 is also configured to receive, generate and communicate session data 144 and to store the session data 144 in the data store 138. In various examples, the server module 136 may select aspects of the streams 142 that are to be shared with the client computing devices 106(1) through 106(N). The server module 136 may combine the streams 142 to generate teleconference data 146 defining aspects of the teleconference session 104. The teleconference data 146 can comprise individual streams containing select streams 142. The teleconference data 146 can define aspects of the teleconference session 104, such as an user interface arrangement of the user interfaces on the clients, the type of data that is displayed and other functions of the server and clients. The server module 136 may configure the teleconference data 146 for the individual client computing devices 106(1)-106(N). Teleconference data, which can be divided into individual instances referenced as 146(1)-146(N). The output module 140 may communicate the teleconference data instances 146(1)-146(N) to the client computing devices 106(1) through 106(N). Specifically, in this example, the output module 140 communicates teleconference data 146(1) to client computing device 106(1), teleconference data 146(2) to client computing device 106(2), teleconference data 146(3) to client computing device 106(3), and teleconference data 146(N) to client computing device 106(N), respectively.

The teleconference data instances 146(1)-146(N) may communicate audio that may include video representative of the contribution of each participant in the teleconference session 104. Each teleconference data instance 146(1)-146(N) may also be configured in a manner that is unique to the needs of each participant user of the client computing devices 106(1) through 106(N). Each client computing device 106(1)-106(N) may be associated with a teleconference session view. Examples of the use of teleconference session views to control the views for each participant at the client computing devices are described with reference to FIG. 2.

Figure 2:
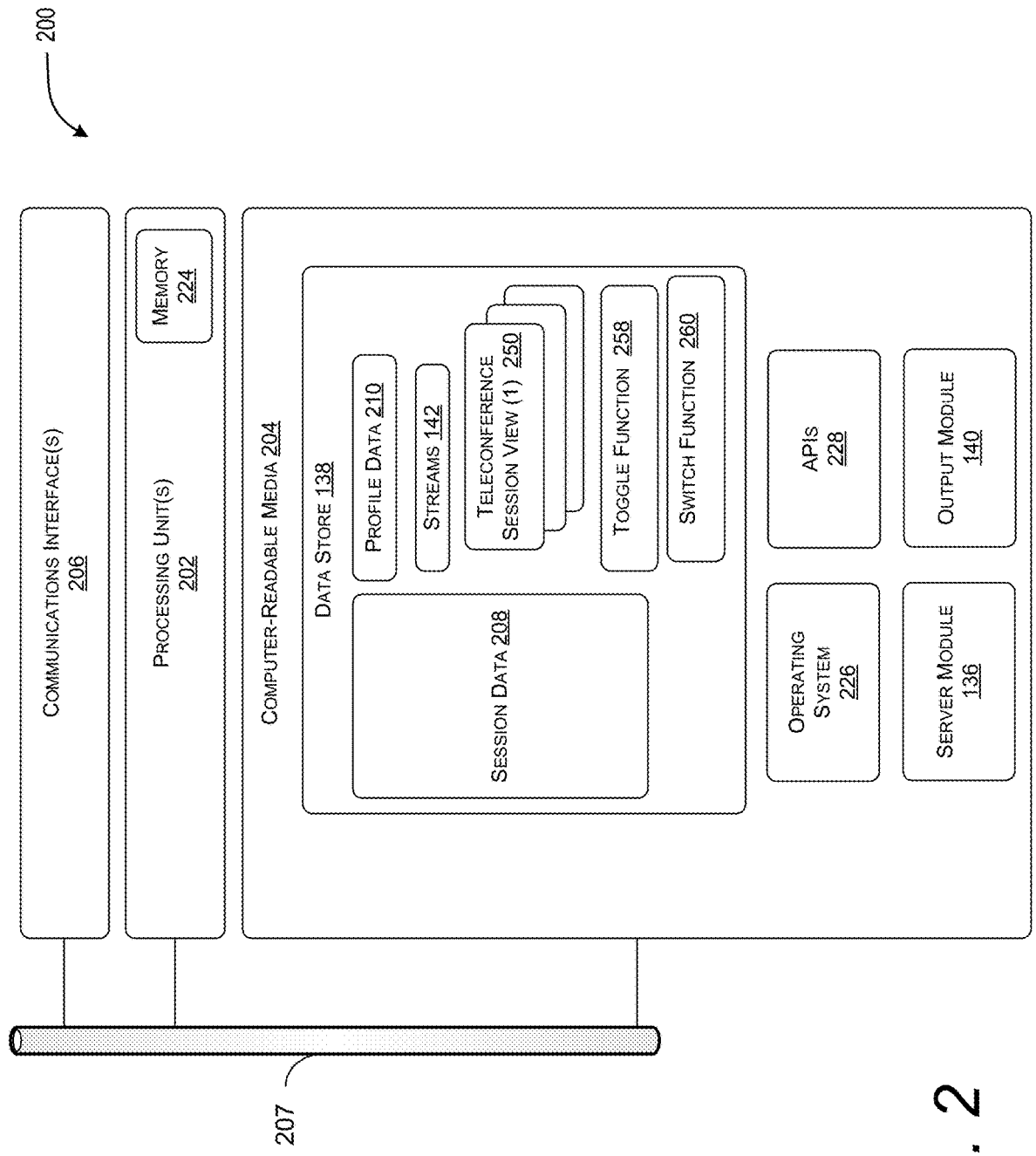
FIG. 2 is a block diagram of an example of the device in the teleconference system of FIG. 1.

In FIG. 2, a system block diagram is shown illustrating components of an example device 200 configured to provide the teleconference session 104 between the client computing devices, such as client computing devices 106(1)-106(N) in accordance with an example implementation. The device 200 may represent one of device(s) 110 where the device 200 includes one or more processing unit(s) 202, computer-readable media 204, communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. The communication interfaces 206 are used to communication over a data network with client computing devices 106.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, the data store 138 may store session data 208 (e.g., session data 144), profile data 210, and/or other data. The session data 208 may include a total number of participants in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a participant identity ("ID") and other data.

In an example implementation, the data store 138 stores data related to the view each participant experiences on the display of the participants' client computing devices 106. As shown in FIG. 2, the data store 138 may include a teleconference session view 250(1) through 250(N) corresponding to the display of each client computing device 106(1) through 106(N) participating in the teleconference session 104. In this manner, the system 102 may support individual control over the view each user experiences during the teleconferenced session 104. For example, as described in more detail below with reference to FIGS. 3A-3F and 4A-4D, the system 102 permits a user to participate with an overlay view or a persistent view displayed on the user's client computing device 106. Overlay views feature the display of desired media on a stage that may cover substantially an entire window on the display screen when in a windowed mode, or substantially an entire display screen in an immersive mode. Controls, user interface elements such as icons, buttons, menus, etc., and other elements not directly relevant to the presentation provided by the teleconference session on the display simply do not appear. A persistent view provides a stage, or primary stream display area, that covers a dominant area of the display and one or more marginal, or secondary stream display areas, that render other aspects of the teleconference session. Both the primary stream display area and secondary stream display area may cover a window with the display screen when in a windowed mode, or substantially the entire screen when in immersive mode.

Persistent and overlay views provide the user with options for how the user may experience the teleconference session. The view on a user's display may be changed under user control to emphasize different aspects of a teleconference session based on the interest of the user. A user may wish to view content, such as a document, or presentation, more closely than the media being communicated from the users. Each user may focus, or promote the content over the participants by having the content rendered in the primary stream display area. Conversely, a user may wish to engage more closely with participants by promoting the media transmitted by the participants to the primary stream display area of the display.

Default views may be presented to the users based on whether content media data is being shared in the teleconference session. With no content media data to share, the display may default to the overlay view. When content is being shared, the display may default to the persistent view. Default views may be displayed when a participant first enters a teleconference session before having the option to select a view. Default views may also be displayed as content is added or removed. While in an overlay view, the view may switch to the persistent view as a default when content is added. Conversely, while in a persistent view, the view may switch to the overlay view when content is removed.

The teleconference session view 250(1)-250(N) may store data identifying the view being displayed for each client computing device 106(1)-106(N). The teleconference session view 250 may also store data relating to streams of the media data configured for display, the participants associated with the streams, whether content media is part of the display, and information relating to the content. Some teleconference sessions may involve a large number of participants. However, only a core number of the participants may be what can be referred to as "active participants." The teleconference session view for each user may be configured to focus on media provided by the most active participants. Some teleconference sessions may involve a presenter, such as in a seminar, or a presentation by one or more individuals. At any given time, one participant may be a presenter, and the presenter may occupy an enhanced role in a teleconference session. The presenter's role may be enhanced by maintaining a consistent presence on the user's display. Information relating to the presenter may be maintained in the teleconference session view 250.

During a teleconference session, a participant may wish to switch to different views of the session at any given time to emphasize or promote either content or people in the user's view. The user can toggle on a user interface element representing the people or content the user wants to promote. The toggle is communicated to the server module 136 in a control signal 156, which is a toggle control signal for a toggle function. The server module 136 may modify a teleconference session view 250 accordingly.

As noted above, the data store 138 may store the profile data 210, streams 142, teleconference session views 250, session data 208, toggle function 258, and switch function 260. Alternately, some or all the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes an operating system 226 and an application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the system 102 is configured to host the teleconference session 104 with the plurality of client computing devices 106(1) through 106(N). The system 102 includes one or more processing units 202 and a computer-readable medium 204 having encoded thereon computer-executable instructions to cause the one or more processing units 202 to receive streams 142(1)-142(M) at the system 102 from a plurality of client computing devices 106(1)-106(N), select streams 142 based, at least in part, on the teleconference session view 250 for each user, and communicate teleconference data 146 defining the teleconference session views 250 corresponding to the client computing devices 106(1) through 106(N). The teleconference data instances 146(1)-146(N) are communicated from the system 102 to the plurality of client computing devices 106(1) through 106(N). The teleconference session views 250(1)-250(N) cause the plurality of client computing devices 106(1)-106(N) to display views of the teleconference session 104 under user control. The computer-executable instructions also cause the one or more processing units 202 to determine that the teleconference session 104 is to transition to a different teleconference session view of the teleconference session 104 based on a user communicated view switch control signal 156.

In some implementations, the techniques disclosed herein may utilize one or more predetermined interface arrangements, also referred to as "views," or "teleconference session views." In an example of operation, the system 102 performs a method that includes receiving the streams 142(1)-142(N) at the system 102 from a plurality of client computing devices 106(1)-106(N). The system combines and formats the streams 142 based, at least in part, on a selected teleconference session view for each client computing device to generate teleconference data 146, e.g., teleconference data instances 146(1)-146(N). The teleconference data instances 146(1)-146(N) are then communicated to the individual client computing devices 106(1)-106(N).

As will be described below, the predetermined interface arrangements of the teleconference session views can include a primary stream display area (referred to herein as a "canvas" or "stage") and a secondary stream display area (referred to herein as a display area of the display that displays "thumbnails"). In some implementations, the secondary stream display area can individually be configured as a region comprising selectable user interface elements for selecting streams of media data associated with the individual display areas. The predetermined interface arrangements can also include graphical elements providing control functionality ("control elements") for a teleconference session. For instance, a graphical element may be generated on the user interface enabling a user to provide content, end a session, mute one or more sounds, etc.

In one illustrative example, the techniques disclosed below can utilize the overlay view. The overlay view may comprise one or more control elements. In some configurations, the control elements can be displayed to the user for a predetermined period of time and then fade after the predetermined period of time has lapsed. In response to certain types of user activity, such as hovering a pointing device over a predetermined area of the user interface, the control elements may reappear for a predetermined period of time.

The overlay view can include the presentation of people or content in a primary stream display area and the presentation of people or content in a secondary stream display area. The secondary stream display area can include user interface elements that may be rendered for a predetermined period of time. The user interface elements are rendered as an overlay on the primary stream display area in a user-ON state, and then fade (e.g., configured to disappear) after the predetermined period of time has lapsed.

A given user interface element in the secondary stream display area can be selected by a user to "pin" a particular display of content or a person to the user interface. The user interface element for the content or user for which the "pin" element is selected does not fade over time, but rather remains displayed in the secondary stream display area overlaid on the primary stream display area.

In another illustrative example, the techniques disclosed herein can utilize the persistent view. The persistent view can provide one or more control elements, which can be configured as described above. In general, the persistent view is designed to provide an optimized interface for sharing content. The persistent view can include the presentation of people or content in a primary stream display area or, either content or people in the secondary stream display area. In the persistent view, the presentation of the people or content in the secondary stream display area does not disappear after a predetermined period of time.

It is noted that the above description of the hosting of a teleconference session 104 by the system 102 implements the control of the teleconference session view in a server function of the device 110. In some implementations, the server function of the device 110 may combine all media portions into the teleconference data for each client computing device 106 to configure the view to display. The information stored in the teleconference session view as described above may also be stored in a data store of the client computing device. The client computing device may receive a user input and translate the user input as being a view switching control signal that is not transmitted to the server. The view switching control signal may be processed on the client computing device itself to cause the display to switch to the desired view. The client computing device 106 may change the display by re-organizing the portions of the media data and content media data (if present) in the teleconference data 146 received from the server according to the view selected by the user.

The ability for users to switch between an overlay view and a persistent view is described with reference to screenshots of the display. Specifically, reference is made to FIGS. 3A-3F, which illustrate example displays in the overlay view. In an overlay view, the secondary stream display area is not displayed unless the view transitions to a user-ON state in which the user is permitted to select a user interface element in the secondary stream display area. FIG. 3A depicts an example of a display 150(1), which is shown connected to interface 134 of client computing device 106(1) in FIG. 1, displaying an overlay-immersive view of the teleconference session 104 in a user-OFF state in accordance with an example implementation.

The overlay view of display 150(1) includes a primary stream display area 302 extending across the screen area of the display 150(1). In some configurations, the primary stream display area 302 is configured in a manner that dominates the display. In some configurations, the primary stream display area 302 can be substantially from edge-to-edge. As summarized above, the overlay view can optionally include a secondary stream display area based on one or more conditions. In some configurations, the primary stream display area 302 can be larger than the secondary stream display area. The example of FIG. 3A illustrates one example of the overlay view that does not display a secondary stream display area. A pointer 310 is provided to permit the user to interact with the view. The primary stream display area 302 is divided into four graphic elements 304*a-d* each corresponding to a user media data. The user media data includes audio, audio and video, or audio and an image communicated from a client computing device belonging to a user participating in the teleconference session.

Four graphic elements 304*a*-304*d* are shown occupying the primary stream display area 302 in the example shown in FIG. 3A; however, any number of graphic elements may be displayed. In some examples, the number of displayed graphic elements may be limited to a maximum by available bandwidth or by a desire to limit video clutter on the display 150(1). Fewer than four graphic elements 304*a*-304*d* may be displayed when fewer than four participants are involved in the teleconference session. In teleconference sessions involving more than the maximum number of graphic elements, the graphic elements 304*a-d* displayed may correspond to the dominant or those deemed to be "active participants." The designation of "active participants" may be pre-defined as a reference to specific people, or as in some implementations, a function may be provided to identify "active participants" versus passive participants by applying an activity level priority.

The activity level priority ranks participants based on their likely contribution to the teleconference. In an example implementation, an activity level priority for identifying active versus passive participants may be determined at the server 136 by analyzing the media data of each participant. The teleconference system may include a function that compares the activity of participants and dynamically promotes those who speak more frequently or those that move and/or speak more frequently to be the active participants.

The placement of the graphic elements 304a-304d may also reflect the activity level priority of the participants to which the graphic elements correspond. For example, an overlay view may be defined as having a convention in which the top left corner of the primary stream display area 302 displays the graphic element 304a corresponding to the most dominant participant. In some sessions, the dominant participant may be a presenter. The top right corner of the primary stream display area 302 may display the graphic element 304b corresponding to the second ranked participant. The lower right hand corner of the primary stream display area 302 may display the graphic element 304c corresponding to the third ranked participant. The lower left hand corner of the primary stream display area 302 may display the graphic element 304d corresponding to the lowest ranked participant. In some sessions, the top right corner may display the graphic element 304a corresponding to a presenter, and the other three positions on the primary stream display area 302 may dynamically switch to more active participants at various times during the session.

In an example implementation, the transition to the user-ON state may be triggered when the user moves the input device controlling the pointer 310 on display 150(1) in FIG. 3A. The client computing device 106 detects the input device motion, or any other type of input, and in response to the input, the device 106 may responsively transmit a state change indicator to the server to modify the view from a user-OFF view shown in FIG. 3A to the user-ON view shown in FIG. 3B. FIG. 3B depicts the transition to the user-ON state in which a secondary stream display area 315 encompasses a "ME" user interface element 320 and a content user interface element 324. In the overlay view, the secondary stream display area 315 is overlaid on the primary stream display area 302. The display change due to the transition to the user-ON state may be limited to an appearance time after which the secondary stream display area 315 overlaying the primary stream display area 302 would disappear so that the display 150(1) would revert to the overlay-immersive user-OFF view as shown in FIG. 3A.

FIG. 3B shows the "ME" user interface element 320 having an image, an avatar, or a video of the user of the client computing device 106(1) on which the teleconference session is playing. FIG. 3B also shows the content user interface element 324 having an image, an avatar, or a video representing content to be shared. In some implementations, the image or video may be configured to display the content media data within the secondary stream display area 315. The "ME" user interface element 320 and/or the content user interface element 324 may be displayed as a miniaturized video or image screen having any suitable aspect ratio such as for example, 16:9, 4:3, 3:2, 5:4, 5:3, 8:5, 1.85:1, 2.35:1, or any aspect ratio deemed suitable in specific implementations. The miniaturized screen may be playing video while in the secondary stream display area 315 in the user-ON state. The secondary stream display area 315 may also include one or more passive participant user interface elements 308 associated with media data communicated by participants that may be categorized as being passive participants as opposed to active participants. The content user interface element 324 and the "ME" user interface element 320 may include a pin 326 to pin the content user interface element 324 and the "ME" user interface element 320 to the display. Any or all of the passive participant user interface elements 308 may also include a pin 326 to pin the corresponding user interface element to the display. For teleconference sessions that include more than a predetermined number of active and passive participants to indicate in the teleconference session display, the passive participants may be ranked according to the activity level priority described above. The most active participants are displayed in the primary stream display area 302 and a selected number of user interface elements corresponding to the next most active participants may be displayed as passive participants 308 in the secondary stream display area 315. In another example implementation, the passive participants may be indicated by a single icon or avatar containing a number of total participants in the teleconference session as described below with reference to FIG. 3C.

The user-ON state may also cause other user interface controls to appear on the display 150(1) in addition to the secondary stream display area 315. For example, the display 150(1) may include an applications bar 312, a view control bar 314, and a tools bar 316. The applications bar 312 may include control elements for selecting one or more applications during the teleconference session. For example, a user may wish to start a chat session with another user or group of users in parallel with the teleconference session. The user may wish to bring up a calendar or check on any alerts that may have popped up during the teleconference session. The view control bar 314 may include control elements, such as buttons or switches, that may be used to change the teleconference session view. For example, the user may wish to switch to the persistent view, or to a multi-tasking view in which the applications bar 312 remains on the display 150(1) along with a display for any application in use. The tools bar 316 may include tools for controlling the visual aspects of the display or other aspects of the session.

While the display 150(1) is in the user-ON state, the user graphic elements 304a-d may include images or text that identifies aspects of the teleconference. For example, a dominant participant's name 317 may be displayed in the first user graphic element 304a. A second participant's name 319 may be displayed in the second user graphic element 304b. A third participant's name 321 may be displayed in the third graphic element 304c. A fourth participant's name 323 may be displayed in the fourth graphic element 304d. The display 150(1) may also include a meeting identifier 325, which may include text indicating a name for the teleconference to provide some context on the display. The meeting identifier 325 may also include a time of day, or a timer indicating the time elapsed during the meeting. The meeting identifier 325, the dominant participant's name 317, the second participant's name 319, the third participant's name 321, and the fourth participant's name 323 may all be displayed for a user-ON time and then disappear. In one illustrative example, a user-ON time can be a few seconds, e.g., 3-5 seconds. The time for display of the images or text relating to these aspects of the teleconference may be the same as the time for displaying the secondary stream display area 315, or different in different implementations.

The user-ON state may also cause a set of core controls 330 to appear as shown in dashed lines in FIG. 3B. In the illustrated example, the view on the display 150(1) includes the set of core controls 330, which can be configured to control aspects of the teleconference session 104. For instance, a first button of the core controls 330 can disconnect the device 106(1) from the teleconference session 104. A second button of the core controls 330 can control the microphone of the device 106(1), i.e., a mute button. A third button of the core controls 330 can control the camera of the device 106(1), i.e., toggle the camera on or off. A fourth button of the core controls 330 can be used to add users to the session 104. In response to receiving the user actuation of the fourth button, a menu can be displayed enabling users to select other users to become meeting participants.

These examples of core controls 330 are provided for illustrative purposes and are not to be construed as limiting. It can be appreciated that the core controls 330 can involve any suitable functionality related to the teleconference session 104. For instance, one or more buttons of the core controls 330 can change limits on the bandwidth related to the video data streams, display properties, etc. In some configurations, the display of the core controls 330 can fade over a predetermined time period similar to the other controls that fade after a time period described above. In such configurations, the core controls 330 can be redisplayed based on one or more actions, such as a hover or another suitable user gesture within a predetermined area of the user interface. The core controls 330 shown in FIG. 3B are represented in dashed lines to illustrate that the core controls 330 may not be displayed in a user-OFF state, or after a predetermined period of time. In some configurations, the core controls 330 may remain visible in the primary stream display area 302 of the display, or in another area of the display as required.

In an example implementation, the appearance time for the content or people displayed in the secondary stream display area 315 may be different from the appearance time for the applications bar 312, the view control bar 314, and the tools bar 316. In one example, the appearance time for the secondary stream display area 315 may run from the moment the pointer 310 stops on the display 150(1) while the appearance time for the applications bar 312, view control bar 314, and tools bar 316 may be the time during which the pointer 310 is in motion. The applications bar 312, view control bar 314, and tools bar 316 would then disappear once the pointer 310 stops moving on the display 150(1). In another example, the secondary stream display area 315 may be timed to remain visible longer than the applications bar 312, view control bar 314, and tools bar 316. In another example, the applications bar 312, view control bar 314, and tools bar 316 may appear upon the motion of the pointer 310 and time out after the pointer stops, while the secondary stream display area 315 may appear only when the pointer 310 hovers over the area on which the secondary stream display area 315 is positioned. In another example, the user interface elements in the secondary stream display area 315 may include a pin 326 (e.g. as shown on the content user interface element 324 in FIG. 3B). The user may select the pin 326 to keep the content user interface element 324 visible after the user-ON state times out. The other user interface elements 320 and 324 may disappear after the user-ON state times out. The content user interface element 324 would remain visible in the secondary stream display area 315 over the primary stream display area 302.

FIG. 3C is an example of the display 150(1) in the overlay view after a user has changed the display device to operate in a windowed mode. The display 150(1) is in the overlay view, except the primary stream display area 302 extends across a window display area of a window 303 in which the display area is less than the screen area of the display 150(1). Windows 303 are well known components of graphical user interfaces as a way of allowing for the use of multiple applications on multiple windows simultaneously. In the example illustrated in FIG. 3C, the teleconference session is operating in the window 303. The window 303 includes an applications tool bar 305 with icons for tools such as a "Save" function, an undo function, a re-do function, a minimize window function, and a close window function.

The display mode may be switched between windowed (as shown in FIGS. 3C and 3D) and immersive (as shown in FIGS. 3A and 3B) by triggering some control on the client computing device 106. The control may be provided during configuration of the display, or during operation of the teleconference session.

The overlay view in FIG. 3C is the same overlay view as shown in FIG. 3B except the overlay view in FIG. 3C is displayed within the window 303 displayed on the screen of display 150(1). In addition, in the overlay view in FIG. 3C, only a single passive participant user interface element 308 is shown in the secondary stream display area 315. The single passive participant user interface element 308 in FIG. 3C includes a number within the icon of the passive participant user interface element 308 indicating a number of participants in the teleconference session. FIG. 3D is a screenshot depicting the overlay-windowed view from FIG. 3C in the user-OFF state. In the user-OFF state, the secondary stream display area 315, and the applications bar 312, view control bar 314, and tools bar 316, disappear leaving the primary stream display area 302 displayed over the display area of the window 303.

It is noted that the secondary stream display area 315 is overlaid on the primary stream display area 302 in a lower portion of the display 150(1) in FIGS. 3B and 3C. The placement of the secondary stream display area 315 in these examples is selected for purposes of describing example implementations. The secondary stream display area 315 may be placed anywhere on the display 150(1) that is suitable for a given application. In the overlay view, the secondary stream display area 315 is overlaid on the primary stream display area 302 in the user-ON state, or when user interface elements in the secondary stream display area 315 are pinned to the display 150(1).

FIG. 3E shows the display 150(1) of a client computing device 106(1) implemented as a mobile device, such as for example, a mobile phone. It is noted that elements common to the display 150(1) depicted in examples of the larger display on a laptop or desktop as shown in FIGS. 3A-3D are described using the same reference numbers.

The display 150(1) in FIG. 3E is a screenshot showing a view with a primary stream display area 302 that depicts active participant graphic elements 304a-d similar to the view on the display 150(1) in FIG. 3A, only on a smaller screen. The smaller mobile device may be transitioned to a user-ON state similar to that of the display 150(1) in FIG. 3B. The transition to the user-ON state may be performed by, for example, tapping on the display 150(1), pressing the display 150(1) for a minimum period of time, swiping the display 150(1), or pressing a physical button elsewhere on the device. FIG. 3F shows the display 150(1) in the user-ON state, in which the view includes the "ME" user interface element 320 and the content user interface element 324 placed generally in a portion of the display 150(1) that can be denoted as a secondary stream display area.

The display 150(1) in FIG. 3F includes a view control bar 314 that includes a set of view switch controls and a set of core controls 330. The view control bar 314 may be implemented as buttons, or a user interface element that may be selected to change the display 150(1) to another view. For example, one of the view switches in the view control bar 314 may be used to switch the display 150(1) from the overlay view depicted in FIG. 3F to a persistent view described below with reference to FIGS. 4C and 4D. The second view switch in the view control bar 314 is shown in grey and with a highlighted outline to indicate it has been selected. The selection of the second switch in the view control bar 314 in FIG. 3F switches views. A view switch control signal may be sent to the server controlling the teleconference session. The server changes the teleconference session view and changes the teleconference data that is communicated to the mobile client computing device to change the display to the persistent view. In this example, the view is switched from the overlay view to the persistent view. The view control bar 314 may enable switching from persistent to overlay views, or to other views that may be defined in an example implementation.

The core controls 330 provide call control functions and call configuration functions that may be used during the teleconference session. The core controls 330 shown in FIG. 3F are similar to the core controls 330 described above with reference to FIG. 3B.

FIGS. 4A-4B illustrate example display views in the process of changing as the teleconference session views are to a persistent view. FIGS. 4C-4D are also referenced in the description below to provide an example of switching to the persistent view on a client computing device that is a mobile computing device, such as for example, a phone or a tablet computer.

FIG. 4A depicts an example of the display 150(1) in the persistent view in which a content graphic element 460 is displayed in a primary stream display area 402, or stage. The primary stream display area 402 has an area that dominates the display 150(1) while leaving space to display a secondary stream display area 415 concurrently with the primary stream display area 402. The persistent view in FIG. 4A is in a persistent-immersive view in which both the primary stream display area 402 and the secondary stream display area 415 substantially cover a screen area of the display 150(1).

The secondary stream display area 415 may include user interface elements displayed as thumbnails or icons. More specifically as shown in FIG. 4A, the secondary stream display area 415 includes a "ME" user interface element 404 displayed as an icon or thumbnail, four active participant user interface elements 406a-d displayed as thumbnails, and four passive participant user interface elements at 408 displayed as avatars or icons. The "ME" user interface element 404 may be displayed as a thumbnail operating as a miniaturized video screen as described above. The secondary stream display area 415 is displayed beneath the primary stream display area 402 so as not to overlay the primary stream display area, which is one aspect that distinguishes the persistent view from the overlay view. The secondary stream display area 415 is shown below the primary stream display area 402, but may be positioned anywhere on the display relative to the primary stream display area 402.

The active participant user interface elements 406a-d may be represented as an image or video thumbnails that display an image or video corresponding to media data transmitted by the users associated with the active participant user interface elements 406a-d while in the secondary stream display area 415. The image or video thumbnail may be implemented as a miniature video or image screen having any suitable aspect ratio such as for example, 16:9, 4:3, 3:2, 5:4, 5:3, 8:5, 1.85:1, 2.35:1, or any aspect ratio deemed suitable in specific implementations The active participant user interface elements 406a-d may be ranked, or prioritized as described above with reference to FIG. 3B. The position of the participant user interface elements 406a-d may indicate the rank or priority based on an activity level priority. For example, the first participant user interface element 406a may be a presenter or a dominant participant (e.g. ranked by position, such as leader of an organization) in the teleconference session. The second, third and fourth participant user interface elements 406b, c, and d may be ranked in order from right to left, or from left to right starting from the first participant user interface element 406a. One example of the ranking of active participants is shown at 401 in grey outlined with dashed lines to indicate that the area at 401 is not part of the display.

The passive participant user interface elements at 408 are shown in FIG. 4A as avatars. The passive participant user interface elements 408 may or may not have associated media data communicated to the client computing device. In an example implementation, the system may monitor and compare the activity of the users associated with the active and passive user interface elements 406a-d, 408. The system may determine an activity level priority for each participant and include user interface elements with media data from participants having the highest activity level priority. The activity level priority may be used to promote or demote participants thereby providing a dynamic presentation of participants in the secondary stream display area. More active participants represented with passive user interface elements at 408 may be moved to correspond with an active participant user interface element 406. Similarly, active participants that become quieter than one or more passive participants may be moved to correspond with a passive participant user interface element at 408. Unlike the overlay view, the secondary stream display area 415 in the persistent view does not disappear, but rather remains visible during the session.

The display in persistent view may include an applications bar, a tools bar, and core controls, as described above with reference to FIG. 3B. These bars may appear and time out when the pointer is moved. The display in the persistent view may include a view control bar 414 to enable switching views to the overlay view, for example. The view control bar 414 in FIG. 4A is outlined with dashes to indicate it may disappear after a period of time. The user may employ the pointer 410 to select one of the view switches in the view control bar 414 to switch to a desired view as described above with reference to FIG. 3B.

As noted above, FIG. 4A shows the persistent view in the persistent-immersive view. FIG. 4B shows the display 150(1) in the persistent-windowed view. The persistent-windowed view in FIG. 4B may be displayed using a view control mechanism on the graphical user interface of the display 150(1). For example, one of the view switches in the view control bar 414 in FIG. 4A may be configured to switch the view to the immersive mode regardless of which view is on display. Another switch may be configured to switch the view to the windowed view. Any number of switches may be disposed in the view control bar 414 as needed in a specific implementation.

The display 150(1) in FIG. 4B includes all of the elements described above with reference to FIG. 4A for the persistent-immersive view, except that the persistent view is displayed within a window 403 covering a part of the screen area of the display 150(1). The windowed mode is described above with reference to FIG. 3C.

FIG. 4C shows the display 150(1) where the client computing device 106(1) is a mobile device, such as for example, a mobile phone. The reference numbers of elements in FIGS. 4A-4B are maintained for like elements in FIGS. 4C-4D. The display 150(1) in FIG. 4C includes a view with a primary stream display area 402 that depicts graphic elements 420a-d similar to the view on the display 150(1) in FIG. 4A, only on a smaller screen. The display 150(1) in FIG. 4C includes a view control bar 414 that includes a set of view switch controls and a set of core controls 430. The view control bar 414 and core controls 430 may be implemented as described above with reference to FIG. 4A-4B.

The display 150(1) in FIG. 4C is in the persistent state. The primary stream display area 402 is displayed so as to dominate the area of the display 150(1) while leaving space on the screen. A "ME" user interface element 404 and a content user interface element 407 are also displayed in a region that may be deemed a secondary stream display area. The content user interface element 407 is shown in grey with a wide grey border indicating it may be selected to promote content into the primary stream display area 402 in accordance with a toggle function as shown in FIG. 4D. The persistent view in FIG. 4D may be enhanced by display of the "ME" user interface element 404, a dominant participant user interface element 406a, a second active participant user interface element 406b, a third active participant user interface element 406c, and a passive participant user interface element 408.

In some configurations, a server or client computer can determine when content is part of the teleconference data. For instance, the server can determine when a client computing device is sharing content media, such as a file, an image of an application, an application share screen, or any other type of content. Based on determining when content is part of the teleconference data or is not is part of the teleconference data, one or more default view can be selected.

In addition, a server or client computer may combine portions of the media data to generate teleconference data. Where the teleconference data can be configured to provide a primary stream display area for displaying a first stream of the teleconference data and a secondary stream display area for displaying a second stream of the teleconference data, as shown in the figures and described above. The teleconference data can be configured to cause at least one client computing device of the plurality of client computing devices to display a first user interface arrangement as a default when no content is part of the teleconference data. In some configurations, the first user interface arrangement displays the secondary stream display area overlaid on a first part of the primary stream display area. The first part of the primary stream display area can be covered by the displayed content or people displayed in the secondary stream display area, e.g., in FIG. 3B, user interface element 324 can cover a first part of the primary stream display area. In addition, the first user interface arrangement displays at least a part of the first stream of the teleconference data on a second part of the primary stream display area. The second part of the primary stream display area can be, for instance, the part that is not covered by the content or people displayed in the secondary stream display area. In some configurations, the secondary stream display area can be smaller than the primary stream and the secondary stream display area can be sized to allow the display of, and partially cover, people or content displayed in the primary stream display area. In some configurations, the display of the second stream within secondary stream display area disappears after a predetermined time. The second user interface arrangement can be selected as a default when content is part of the teleconference data. As described herein, the second user interface arrangement displays the primary stream display area and the secondary stream display area concurrently. In some configurations, the primary stream display area and the secondary stream display area are displayed in a side-by-side configuration.

Turning now to FIG. 5, aspects of a routine 500 for switching views on the display of a client computing device 106 are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by an application, component and/or circuit, such as the server module 136 in device 110 in FIG. 1 in the system 100 hosting the teleconference session 104. In some configurations, the server module 136 can be a dynamically linked library (DLL), a statically linked library, functionality produced by an application programing interface (API), a compiled program, an interpreted program, a script or any other executable set of instructions. Data and/or modules, such as the server module 136, can be stored in a data structure in one or more memory components. Data can be retrieved from the data structure by addressing links or references to the data structure.

Although the following illustration refers to the components of FIG. 1 and FIG. 2, it can be appreciated that the operations of the routine 500 may also be implemented in many other ways. For example, the routine 500 may be implemented, at least in part, or in modified form, by a processor of another remote computer or a local circuit, such as for example, the client module 130 in the client computing device 106(1). In addition, one or more of the operations of the routine 500 may alternatively or additionally be implemented, at least in part, by a chipset working alone or in conjunction with other software modules. Any service, circuit or application suitable for providing the techniques disclosed herein can be used in operations described herein.

Referring to FIG. 5, the routine 500 begins at 502, where the server module 136 receives a plurality of streams 142(1)-142(N) from corresponding client computing devices 106(1)-106(N). Users of each client computing device communicate a request to join the teleconference session 104 and communicate a media stream 142 once authorized to participate in the teleconference session 104. The server module 136 receives the streams 142 from each client computing device 106.

At step 504, portions of the media data are combined to generate teleconference data 146 corresponding to a selected client computing device 106(1) having a display device 150(1). In an example implementation, the teleconference session view may be a first user interface arrangement or a second user interface arrangement. In some configurations, step 504 can involve an operation where a server or client computer can analyze the teleconference data or the media data to determine the presence of content. For instance, the server can determine when a client computing device is sharing content media, such as a file, an image of an application, an application share screen, or any other type of content. Based on determining when content is part of the teleconference data or is not is part of the teleconference data, one or more default view can be selected.

At step 506, the teleconference data is configured to display in the first user interface arrangement, which may correspond to an overlay view as described with reference to FIGS. 3A-3F. In this example implementation, the overlay view may be selected as a default view when the media data does not include content media data. For example, a user may enter a teleconference session before tools are provided to control the display. At such an initial point in the user's participation, a default view would be selected. If the media data does not include content being shared by participants already part of the teleconference session, the default view is the overlay view.

At step 508, the teleconference data is configured to display in the second user interface arrangement, which may correspond to a persistent view as described with reference to FIGS. 4A-4D. In this example implementation, the persistent view may be selected as a default view when the media data includes content media data. For example, a user may enter a teleconference session before tools are provided to control the display. At such an initial point in the user's participation, a default view would be selected. If the media data includes content being shared by participants already part of the teleconference session, the default view is the persistent view.

In some configurations, the secondary stream display area can include a rendering of a plurality of streams of the teleconference data 146. For instance, in the persistent view, any predetermined number of participants or content can be displayed and arranged in the secondary stream display area, wherein the selection of the participants or content can be based on an activity level priority associated with each participant or content. In addition, the order of the participants or content can be based on an activity level priority associated with individual streams of the teleconference data 146 containing participants or content. An example of such a display is described herein and shown in FIG. 4A. Although this example shows renderings of four streams of the teleconference data 146, the secondary stream display area can display any number of streams that are selected and arranged based on the associated activity level priorities.

In configuring the teleconference session view, streams of the teleconference data, which can include portions of media data, may be arranged in a session view based on an activity level priority for each media data presented by each participant. The video or shared content in the media data for each participant may be analyzed to determine an activity level priority for any stream of the teleconference data. The activity level priority, which is also referred to herein as a "priority value," can be based on any type of activity including, but not limited to, any of the following:

1. participant motion—the extent to which a participant moves in the video may determine the participant's activity level. Participants in the process of gesturing or otherwise moving in the video may be deemed to be participating at a relatively high level in the teleconference.
2. participant lip motion—the video may be analyzed to determine the extent to which a participant's lips move as an indication of the extent to which the participant is speaking. Participants speaking at a relatively high level may be deemed to be participating at a corresponding relatively high level.
3. participant facial expressions—the participant's video may be analyzed to determine changes in facial expressions, or to determine specific facial expressions using pattern recognition. Participants reacting through facial expressions in the teleconference may be deemed to be participating at a relatively high level.
4. content modification—video of content being shared in the teleconference may be analyzed to determine if it is being modified. The user interface element corresponding to content may be promoted in rank in the secondary stream display area or automatically promoted to the primary stream display area if the video indicates the content is being modified.
5. content page turning—video of content being shared may be analyzed to determine if there is page turning of a document, for example, and assigned a corresponding activity level priority.
6. number of participants having content in the primary stream display area—video of content being shared may be assigned an activity level priority based on the number of participants that have a view of the content in the primary stream display area or secondary stream display area.
7. participant entering teleconference session—media data from participants entering a teleconference may be assigned a high activity level priority. A priority value can be based on the order in which participants join a session.
8. participant leaving teleconference session—media data from participants entering a teleconference may be assigned a low activity level priority.

At step 510, the teleconference data 146 is transmitted to the selected client computing device 106(1) to display the teleconference data. Once displayed, the user may participate in the teleconference session 104 in the view formatted according to the teleconference session view. The user may modify the view on the display to change the user's experience of the teleconference session. The user may initiate one method for modifying the view by selecting the view switch controls to select a different view for display.

At decision block 514, the switch view function is received from the client computing device 106(1). In some configurations, the switch view function can be based on an input from a user selection of a graphical element, such as a button or a drop-down menu, for example. In some configurations, the switch view function can be based on a signal or data generated by a computing device detecting one or more conditions.

At step 516, the teleconference session view is changed responsive to the switch view signal. The teleconference session view is changed to display the first user interface arrangement, or the overlay view, when the view switch for the overlay view is selected. At step 520, the teleconference session view is changed to display the second user interface arrangement, or the persistent view, when the view switch for the persistent view is selected.

At step 526, the teleconference data is displayed according to the selected view. For example, if the overlay view is selected, the overlay view is displayed as shown in FIG. 3A. If the persistent view is selected, the persistent view is displayed as shown in FIG. 4A.

The disclosure presented herein may be considered in view of the following examples.

Example 1

A method comprising: receiving one or more streams of teleconference data associated with a teleconference session; analyzing the one or more streams to determine the presence of a content stream; configuring said one or more streams to cause at least one client computing device of a plurality of client computing devices to display a first user interface arrangement as a default when the teleconference data does not contain the content stream, wherein the first user interface arrangement comprises a primary stream display area and a secondary stream display area, wherein the secondary stream display area is overlaid on the primary stream display area, wherein the primary stream display area comprises a rendering of a first stream of said one or more streams and the secondary stream display area comprises a rendering of a second stream of said one or more streams, or a second user interface arrangement as the default when the teleconference data contains the content stream, wherein the second user interface arrangement comprises the primary stream display area and the secondary stream display area in a nonoverlapping format, wherein the primary stream display area comprises a rendering of the content stream; transmitting the teleconference data to the at least one client computing device for display of the first user interface arrangement or the second user interface arrangement; and accepting a view switch control signal from the at least one client computing device, wherein said view control signal causes a switch between said first and second user interface arrangements.

Example 2

The method of Example 1 comprising: switching the teleconference data to the second user interface arrangement when the teleconference data is in the first user interface arrangement and when the content stream is introduced to the teleconference data.

Example 3

The method of Examples 1 and 2 comprising: switching the teleconference data to the first user interface arrangement when the teleconference data is in the second user interface arrangement and when the content stream is removed from the teleconference data.

Example 4

The method of Examples 1, 2 and 3 where: the rendering of the second stream within the secondary stream display area is overlaid on the primary stream display area in a user-ON state when the teleconference data is configured to display in the first user interface arrangement; and where the rendering of the second stream within the secondary stream display area disappears after a predetermined period of time.

Example 5

The method of Examples 1, 2, 3, and 4 further comprising: receiving a state change indicator indicating a change of state between the user-ON state and the user-OFF state; where the step of generating teleconference data comprises removing the rendering of the second stream of the teleconference data from the secondary stream display area when the user-ON state transitions to the user-OFF state and the teleconference data is configured in the first user interface arrangement.

Example 6

The method of Examples 1, 2, 3, and 4 further comprising: receiving a state change indicator indicating a change of state from the user-OFF state to the user-ON state; where the step of generating teleconference data comprises: waiting a user-ON time after the change of state from the user-OFF state to the user-ON state; and removing the rendering of the second stream of the teleconference data from the secondary stream display area when the user-ON time expires and the teleconference data is configured in the first user interface arrangement.

Example 7

A method, comprising: receiving teleconference data comprising one or more streams at a client computing device; displaying the teleconference data in a first user interface arrangement as a default when the teleconference data does not include a content stream, wherein the first user interface arrangement displays a secondary stream display area overlaid on a primary stream display area, the primary stream display area comprises a rendering of a first stream of the teleconference data and the secondary stream display area comprises a rendering of a second stream of the teleconference data, or displaying the teleconference data, where the teleconference data is configured in a second user interface arrangement as the default when the teleconference data includes the content stream, wherein the second user interface arrangement includes the primary stream display area and the secondary stream display area concurrently and in a nonoverlapping format; receiving a view switch control signal from a user input at the client computing device; and switching the teleconference data between the first user interface arrangement and the second user interface arrangement in response to the view switch control signal.

Example 8

The method of Example 7 comprising: switching the teleconference data to the second user interface arrangement when the teleconference data is in the first user interface arrangement and when the content stream is introduced to the teleconference data.

Example 9

The method of Examples 7 and 8 comprising: switching the teleconference data to the first user interface arrangement when the teleconference data is in the second user interface arrangement and when the content stream is removed from the teleconference data.

Example 10

The method of Examples 7, 8, and 9 where the step of displaying the teleconference data comprises: determining a display mode for the display device of the client computing device; displaying the primary stream display area over a window display area of a window configured for display within a screen area of the display device when the teleconference data is configured in the first user interface arrangement and the display mode is set to a windowed display mode; and displaying the primary stream display area over a screen area of a display device when the teleconference data is configured in the first user interface arrangement and the display mode is set to an immersive display mode.

Example 11

The method of Examples 7, 8, 9, and 10 where the step of displaying the teleconference data comprises: determining a display mode for a display device of the client computing device; displaying the primary stream display area and the secondary stream display area in a nonoverlapping format over a screen area of the display device when the teleconference data is configured in the second user interface arrangement and the display mode is set to an immersive display mode; and displaying the primary stream display area and the secondary stream display area in a nonoverlapping format over a window display area of a window configured for display within the screen area of the display device when the teleconference data is configured in the second user interface arrangement and the display mode is set to a windowed display mode.

Example 12

The method of Example 7, 8, 9, 10, and 11 where: the secondary stream display area is overlaid on the primary stream display area in a user-ON state when the teleconference data is configured to display in the first user interface arrangement; and where the secondary stream display area disappears in a user-OFF state after a predetermined time period.

Example 13

The method of Examples 7, 8, 9, 10, 11, and 12 further comprising: detecting a state change indicating a change of state between the user-ON state and the user-OFF state; wherein the step of displaying the teleconference data comprises removing the second stream of the teleconference data from the secondary stream display area when the user-ON state transitions to the user-OFF state and the teleconference data is configured in the first user interface arrangement.

Example 14

The method of Examples 7, 8, 9, 10, 11 and 12 further comprising: detecting a state change indicating a change of state from the user-OFF state to the user-ON state; where the step of displaying the teleconference data comprises: waiting a user-ON time after the change of state from the user-OFF state to the user-ON state; and removing the second stream of the teleconference data from the secondary stream display area when the user-ON time expires and the teleconference data is configured in the first user interface arrangement.

Example 15

The method of Examples 7, 8, 9, 10, 11, and 12 further comprising: detecting a user input signal from a user input device; setting the client computing device from the user-OFF state to the user-ON state when a user input signal is detected from a user input device.

Example 16

The method of Examples 7, 8, 9, 10, 11, 12, and 15 where the step of detecting the user input signal comprises: receiving the user input signal from any one of: a mouse; a key on a keyboard; a touchscreen touch; and a touchscreen swipe.

Example 17

A system, comprising: one or more processing units; and a computer-readable medium having encoded thereon computer-executable instructions to cause the one or more processing units to: receive one or more streams of teleconference data associated with a teleconference session; analyze the one or more streams to determine the presence of a content stream; configure said one or more streams to cause at least one client computing device of a plurality of client computing devices to display a first user interface arrangement as a default when the teleconference data does not contain the content stream, wherein the first user interface arrangement displays the secondary stream display area overlaid, in part, on the primary stream display area, wherein the primary stream display area comprises a rendering of a first stream of said one or more streams and the secondary stream display area comprises a rendering of a second stream of said one or more streams, or a second user interface arrangement as a default when content is part of the teleconference data, wherein the second user interface arrangement displays the primary stream display area and secondary stream display area concurrently; transmit the teleconference data to the at least one client computing device for display of the first user interface arrangement or the second user interface arrangement; receive a view switch control signal from the at least one client computing device; switch the teleconference data between the first user interface arrangement and the second user interface arrangement in response to the view switch control signal.

Example 18

The system of Example 17 where the computer-readable medium includes encoded computer-executable instructions to cause the one or more processing units to: switch the teleconference data to the second user interface arrangement when the teleconference data is in the first user interface arrangement and when the content stream is introduced to the teleconference data.

Example 19

The system of Example 17 and 18 where the computer-readable medium includes encoded computer-executable instructions to cause the one or more processing units to: switch the teleconference data to the first user interface arrangement when the teleconference data is configured in the second user interface arrangement and when the content stream is removed from the teleconference data.

Example 20

The system of Examples 17, 18, and 18 where the computer-readable medium includes encoded computer-executable instructions to cause the one or more processing units to: overlay the secondary stream display area on the primary stream display area in a user-ON state when the teleconference data is configured to display in the first user interface arrangement; and where the rendering of the second stream in the secondary stream display area disappears in a user-OFF state.

Example 21

The system of Examples 17, 18, 19, and 20 where the computer-readable medium includes encoded computer-executable instructions to cause the one or more processing units to: receive a state change indicator indicating a change of state between the user-ON state and the user-OFF state; where generating the teleconference data comprises removing the second stream of the teleconference data from the secondary stream display area when the user-ON state transitions to the user-OFF state and the teleconference data is configured in the first user interface arrangement.

Example 22

The system of Example 17, 18, 19, and 20 where the computer-readable medium includes encoded computer-executable instructions to cause the one or more processing units to: receive a state change indicator indicating a change of state from the user-OFF state to the user-ON state; where generating the teleconference data comprises: waiting a user-ON time after the change of state from the user-OFF state to the user-ON state; and removing the rendering of the second stream of the teleconference data from the secondary stream display area when the user-ON time expires and the teleconference data is configured in the first user interface arrangement.

Example 23

A computing device, comprising: one or more processing units; and a computer-readable medium having encoded thereon computer-executable instructions to cause the one or more processing units to: receive teleconference data having a first stream and a second stream; display the teleconference data in a first user interface arrangement as a default when the teleconference data does not include a content stream, wherein the first user interface arrangement comprises a secondary stream display area overlaid on a primary stream display area, wherein the secondary stream display area is smaller than the primary stream display area, the primary stream display area comprises a rendering of the first stream of the teleconference data, and the secondary stream display area comprises a rendering of the second stream of the teleconference data, or in a second user interface arrangement when the teleconference data includes the content stream, wherein the second user interface arrangement displays the primary stream display area and the secondary stream display area in a nonoverlapping configuration; receive a view switch control signal from a user input at the client computing device; switch the teleconference data to the second user interface arrangement when the view switch control signal indicates a request to view the teleconference session in the second user interface arrangement; and switch the teleconference data to the first user interface arrangement when the view switch control signal indicates a request to view the teleconference session in the first user interface arrangement.

Example 24

The system of Example 23 where the computer-readable medium includes encoded computer-executable instructions to cause the one or more processing units to: switch the teleconference data to the second user interface arrangement when the teleconference data is in the first user interface arrangement and when the content stream is introduced to the teleconference data.

Example 25

The system of Examples 23 and 24 where the computer-readable medium includes encoded computer-executable instructions to cause the one or more processing units to: switch the teleconference data to the first user interface arrangement when the teleconference data is in the second user interface arrangement and when the content stream is removed from the teleconference data.

Example 26

The system of Examples 23, 24, and 25 where the computer-readable medium includes encoded computer-executable instructions to cause the one or more processing units to: in displaying the teleconference data: determine a display mode for the display device of the client computing device; display the primary stream display area over a window display area of a window configured for display within a screen area of the display device when the teleconference data is configured in the first user interface arrangement and the display mode is set to a windowed display mode; and display the primary stream display area over a screen area of a display device when the teleconference data is configured in the first user interface arrangement and the display mode is set to an immersive display mode.

Example 27

The system of Example 23 where the computer-readable medium includes encoded computer-executable instructions to cause the one or more processing units to: in displaying the teleconference data: determine a display mode for a display device of the client computing device; display the primary stream display area and the secondary stream display area concurrently on the display device when the teleconference data is configured in the second user interface arrangement and when the display mode is set to an immersive display mode; and display the primary stream display area and the secondary stream display area concurrently over a window display area of a window configured for display within the screen area of the display device when the teleconference data is configured in the second user interface arrangement and the display mode is set to a windowed display mode.

Example 28

The system of Example 23 where the computer-readable medium includes encoded computer-executable instructions to cause the one or more processing units to: overlay the secondary stream display area on the primary stream display area in a user-ON state when the teleconference data is configured to display in the first user interface arrangement; and where the secondary stream display area disappears from the display in a user-OFF state.

Example 29

The system of Example 23, 24, 25, 26, 27, and 28 where the computer-readable medium includes encoded computer-executable instructions to cause the one or more processing units to: detect a state change indicating a change of state between the user-ON state and the user-OFF state; where the step of displaying the teleconference data comprises removing the second stream of the teleconference data from the secondary stream display area when the user-ON state transitions to the user-OFF state and the teleconference data is configured in the first user interface arrangement.

Example 30

The system of Examples 23, 24, 25, 26, 27, and 28 where the computer-readable medium includes encoded computer-executable instructions to cause the one or more processing units to: detect a state change indicating a change of state from the user-OFF state to the user-ON state; where displaying the teleconference data comprises: waiting a user-ON time after the change of state from the user-OFF state to the user-ON state; and removing the second stream of the teleconference data from the secondary stream display area when the user-ON time expires and the teleconference data is configured in the first user interface arrangement.

Example 31

The system of Example 23, 24, 25, 26, 27, and 28 where the computer-readable medium includes encoded computer-executable instructions to cause the one or more processing units to: detect a user input signal from a user input device; set the client computing device from the user-OFF state to the user-ON state when a user input signal is detected from a user input device.

Example 32

The system of Examples 23, 24, 25, 26, 27, 28, and 31 where the computer-readable medium includes encoded computer-executable instructions to cause the one or more processing units to: in detecting the user input signal: receive the user input signal from any one of: a mouse; a key on a keyboard; a touchscreen touch; and a touchscreen swipe.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

We claim:

1. A method comprising:
   receiving one or more streams of communication data associated with a communication session;
   analyzing the one or more streams to determine the presence of a content stream;
   configuring the one or more streams to cause at least one client computing device of a plurality of client computing devices to display
   a first user interface arrangement as a default when the communication data does not contain the content stream, wherein the first user interface arrangement comprises a primary stream display area and a secondary stream display area, wherein the secondary stream display area is overlaid on the primary stream display area, wherein the primary stream display area comprises a rendering of a first stream of the one or more streams and the secondary stream display area comprises a rendering of a second stream of the one or more streams, or a second user interface arrangement as the default when the communication data contains the content stream, wherein the second user interface arrangement comprises the primary stream display area and the secondary stream display area in a nonoverlapping format, wherein the primary stream display area comprises a rendering of the content stream; and transmitting the communication data to the at least one client computing device for display of the first user interface arrangement or the second user interface arrangement.

2. The method of claim 1 comprising:
switching the communication data to the second user interface arrangement when the communication data is in the first user interface arrangement and when the content stream is introduced to the communication data.

3. The method of claim 1 comprising:
switching the communication data to the first user interface arrangement when the communication data is in the second user interface arrangement and when the content stream is removed from the communication data.

4. The method of claim 1 where:
the rendering of the second stream within the secondary stream display area is overlaid on the primary stream display area in a user-ON state when the communication data is configured to display in the first user interface arrangement; and where the rendering of the second stream within the secondary stream display area disappears after a predetermined period of time.

5. The method of claim 4 further comprising:
receiving a state change indicator indicating a change of state between the user-ON state and the user-OFF state; where the step of generating communication data comprises removing the rendering of the second stream of the communication data from the secondary stream display area when the user-ON state transitions to the user-OFF state and the communication data is configured in the first user interface arrangement.

6. The method of claim 4 further comprising:
receiving a state change indicator indicating a change of state from the user-OFF state to the user-ON state; where the step of generating communication data comprises:
waiting a user-ON time after the change of state from the user-OFF state to the user-ON state; and
removing the rendering of the second stream of the communication data from the secondary stream display area when the user-ON time expires and the communication data is configured in the first user interface arrangement.

7. A method, comprising:
receiving communication data comprising one or more streams at a client computing device;
displaying the communication data in a first user interface arrangement as a default when the communication data does not include a content stream, wherein the first user interface arrangement displays a secondary stream display area overlaid on a primary stream display area, the primary stream display area comprises a rendering of a first stream of the communication data and the secondary stream display area comprises a rendering of a second stream of the communication data, and displaying the communication data, where the communication data is configured in a second user interface arrangement as the default when the communication data includes the content stream, wherein the second user interface arrangement includes the primary stream display area and the secondary stream display area concurrently and in a nonoverlapping format.

8. The method of claim 7 comprising:
switching the communication data to the second user interface arrangement when the communication data is in the first user interface arrangement and when the content stream is introduced to the communication data.

9. The method of claim 7 comprising:
switching the communication data to the first user interface arrangement when the communication data is in the second user interface arrangement and when the content stream is removed from the communication data.

10. The method of claim 7 where the step of displaying the communication data comprises:
determining a display mode for the display device of the client computing device;
displaying the primary stream display area over a window display area of a window configured for display within a screen area of the display device when the communication data is configured in the first user interface arrangement and the display mode is set to a windowed display mode; and
displaying the primary stream display area over a screen area of a display device when the communication data is configured in the first user interface arrangement and the display mode is set to an immersive display mode.

11. The method of claim 7 where the step of displaying the communication data comprises:
determining a display mode for a display device of the client computing device;
displaying the primary stream display area and the secondary stream display area in a nonoverlapping format over a screen area of the display device when the communication data is configured in the second user interface arrangement and the display mode is set to an immersive display mode; and
displaying the primary stream display area and the secondary stream display area in a nonoverlapping format over a window display area of a window configured for display within the screen area of the display device when the communication data is configured in the second user interface arrangement and the display mode is set to a windowed display mode.

12. The method of claim 7 where:
the secondary stream display area is overlaid on the primary stream display area in a user-ON state when the communication data is configured to display in the first user interface arrangement; and where the secondary stream display area disappears in a user-OFF state after a predetermined time period.

13. The method of claim 12 further comprising:
detecting a state change indicating a change of state between the user-ON state and the user-OFF state; wherein the step of displaying the communication data comprises removing the second stream of the communication data from the secondary stream display area when the user-ON state transitions to the user-OFF state and the communication data is configured in the first user interface arrangement.

14. The method of claim 12 further comprising:
detecting a state change indicating a change of state from the user-OFF state to the user-ON state; where the step of displaying the communication data comprises:
waiting a user-ON time after the change of state from the user-OFF state to the user-ON state; and
removing the second stream of the communication data from the secondary stream display area when the user-ON time expires and the communication data is configured in the first user interface arrangement.

15. The method of claim 12 further comprising:
detecting a user input signal from a user input device;
setting the client computing device from the user-OFF state to the user-ON state when a user input signal is detected from a user input device.

16. The method of claim 15 where the step of detecting the user input signal comprises:
receiving the user input signal from any one of:
a mouse;
a key on a keyboard;
a touchscreen touch; or
a touchscreen swipe.

17. A system, comprising:
one or more processing units; and
a computer-readable medium having encoded thereon computer-executable instructions to cause the one or more processing units to:
receive one or more streams of communication data associated with a communication session;
analyze the one or more streams to determine the presence of a content stream;
configure the one or more streams to cause at least one client computing device of a plurality of client computing devices to display
a first user interface arrangement as a default when the communication data does not contain the content stream, wherein the first user interface arrangement displays the secondary stream display area overlaid, in part, on the primary stream display area, wherein the primary stream display area comprises a rendering of a first stream of the one or more streams and the secondary stream display area comprises a rendering of a second stream of the one or more streams, or
a second user interface arrangement as a default when content is part of the communication data, wherein the second user interface arrangement displays the primary stream display area and secondary stream display area concurrently;
transmit the communication data to the at least one client computing device for display of the first user interface arrangement or the second user interface arrangement.

18. The system of claim 17 where the computer-readable medium includes encoded computer-executable instructions to cause the one or more processing units to:
switch the communication data to the second user interface arrangement when the communication data is in the first user interface arrangement and when the content stream is introduced to the communication data.

19. The system of claim 17 where the computer-readable medium includes encoded computer-executable instructions to cause the one or more processing units to:
switch the communication data to the first user interface arrangement when the communication data is configured in the second user interface arrangement and when the content stream is removed from the communication data.

20. The system of claim 17 where the computer-readable medium includes encoded computer-executable instructions to cause the one or more processing units to:
overlay the secondary stream display area on the primary stream display area in a user-ON state when the communication data is configured to display in the first user interface arrangement; and wherein the rendering of the second stream in the secondary stream display area disappears in a user-OFF state.

* * * * *